(12) United States Patent
Fan et al.

(10) Patent No.: US 11,664,681 B2
(45) Date of Patent: May 30, 2023

(54) DEVICE AND/OR METHOD FOR WIRELESS SIGNAL DETECTION

(71) Applicant: Arm Limited, Cambridge (GB)

(72) Inventors: Philex Ming-Yan Fan, Cambridge (GB); Parameshwarappa Anand Kumar Savanth, Cambridge (GB); Sahan Sajeewa Hiniduma Udugama Gamage, Cambridge (GB); Pranay Prabhat, Cambridge (GB); Benoit Labbe, Cambridge (GB); Thanusree Achuthan, Great Cambourne (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/364,057

(22) Filed: Jun. 30, 2021

(65) Prior Publication Data

US 2023/0006467 A1   Jan. 5, 2023

(51) Int. Cl.
*H02J 50/00* (2016.01)
*H02M 3/07* (2006.01)
*H02J 50/40* (2016.01)
*H02J 50/20* (2016.01)

(52) U.S. Cl.
CPC ............ *H02J 50/001* (2020.01); *H02J 50/20* (2016.02); *H02J 50/40* (2016.02); *H02M 3/07* (2013.01)

(58) Field of Classification Search
CPC . H02J 5/005; H02J 7/025; H02J 17/00; H01F 38/14; B60L 11/182

USPC ......................................................... 307/104
See application file for complete search history.

(56) References Cited

U.S. PATENT DOCUMENTS

| | | | |
|---|---|---|---|
| 2011/0248834 A1* | 10/2011 | Warner ..................... | H04Q 9/00 340/10.34 |
| 2016/0006369 A1* | 1/2016 | Zoescher ........... | G06K 19/0701 455/73 |
| 2019/0173543 A1* | 6/2019 | Ganesan ................. | H01Q 21/28 |
| 2021/0359656 A1* | 11/2021 | Ting .................... | H03F 3/45475 |

OTHER PUBLICATIONS

Karthaus, et al, "Fully integrated Passive UHF RFID Transponder IC With 16.7-μW Minimum FR Input Power," IEEE Journal of Solid-State Circuits, vol. 38, No. 10, Oct. 2003, 7 Pages.
Kim, et al, "An EPC Gen 2 compatible passive/semi-active UHF RFID transponder with embedded FeRAM and temperature sensor," IEEE Asian Solid-State Circuits Conference, Nov. 12-14, 2007, 4 Pages.
Nakamoto, et al, "A Passive UHF RF Identification CMOS Tag IC Using Ferroelectric RAM in 0.35-μm Technology," IEEE Journal of Solid-State Circuits, vol. 42, No. 1, Jan. 2007, 10 Pages.
Curty, et al, "Remotely Powered Addressable UHF RFID Integrated System," IEEE Journal of Solid-State Circuits, vol. 40, No. 11, Nov. 2005, 10 Pages.

(Continued)

*Primary Examiner* — Quan Tra
(74) *Attorney, Agent, or Firm* — Berkeley Law & Technology Group, LLP

(57) ABSTRACT

Subject matter disclosed herein may relate to detecting wireless signals and/or signal packets and may relate more particularly to detecting wireless signals and/or signal packets at energy-harvesting devices.

20 Claims, 14 Drawing Sheets

(56) References Cited

OTHER PUBLICATIONS

Chan, et al, "A Low-Power Continuously-Calibrated Clock Recovery Circuit for UHF RFID EPC Class-1 Generation-2 Transponders," IEEE Journal of Solid-State Circuits, vol. 45, No. 3, Mar. 2010, 13 Pages.

Law, et al, "A Sub-µW Embedded CMOS Temperature Sensor for RFID Food Monitoring Application," IEEE Journal of Solid-State Circuits, vol. 45, No. 6, Jun. 2010, 10 Pages.

Yeager, et al, "ISSCC 2010/ SESSION 2 / mm-Wave Beamforming & RF Building Blocks / 2.8, A 9.2µA Gen 2 Compatible UHF RFID Sensing Tag with -12dBm Sensitivity and 1.25µVrms Input-Referred Noise Floor," IEEE International Solid-State Circuits Conference, 978-1-4244-6034-2/10, Feb. 8, 2010, 3 Pages.

Tabesh, et al, "A Power-Harvesting Pad-Less Millimeter-Sized Radio," IEEE Journal of Solid-State Circuits, vol. 50, No. 4, Apr. 2015, 16 Pages.

Reinisch, et al, "ISSCC 2011 / Session 26 / Low-Power Wireless / 26.1, A 7.9µW Remotely Powered Addressed Sensor Node Using EPC HF and UHF RFID Technology with-10.3dBm Sensitivity," IEEE International Solid-State Circuits Conference, 978-1-61284-302-5/11, Feb. 23, 2011, 3 Pages.

Lin, et al, "Novel High Positive and Negative Pumping Circuits for Low Supply Voltage," IEEE, 0-7803-5471-0/99, 1999, 4 Pages.

Kurokawa, et al, "UHF RFCPUs on Flexible and Glass Substrates for Secure RFID Systems," IEEE Journal of Solid-State Circuits, vol. 43, No. 1, Jan. 2008, 8 Pages.

Yin, et al, "A System-on-Chip EPC Gen-2 Passive UHF RFID Tag With Embedded Temperature Sensor," IEEE Journal of Solid-State Circuits, vol. 45, No. 11, Nov. 2010, 17 Pages.

Pelissier, et al, "A 112 Mb/s Full Duplex Remotely-Powered Impulse-UWB RFID Transceiver for Wireless NV-Memory Applications," IEEE Journal of Solid-State Circuits, vol. 46, No. 4, Apr. 2011, 12 Pages.

\* cited by examiner

DEVICE AND/OR METHOD FOR WIRELESS SIGNAL DETECTION

BACKGROUND

Field

Subject matter disclosed herein may relate to detecting wireless signals and/or signal packets and may relate more particularly to detecting wireless signals and/or signal packets at energy-harvesting devices.

Information

Evolution of the so-called Internet-of-Things (IoT) is expected to deploy a great many (e.g., millions, billions, etc.) of devices including wireless and/or battery-less devices such as, for example, computational radio frequency identification (C-RFID) tags, battery-less sensors and/or the like. In particular implementations, processing circuits of such battery-less devices may be powered, at least in part, by intermittent radio frequency (RF) energy, intermittent light energy or intermittent acoustical energy, or a combination thereof, collected at the wireless and/or battery-less devices. Wireless and/or battery-less devices such as IoT-type devices may also receive signals and/or signal packets via amplitude-modulated wireless signals, such as amplitude-modulated RF signals. Demodulating amplitude-modulated wireless signals and/or signal packets at wireless and/or battery-less devices may pose significant challenges.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
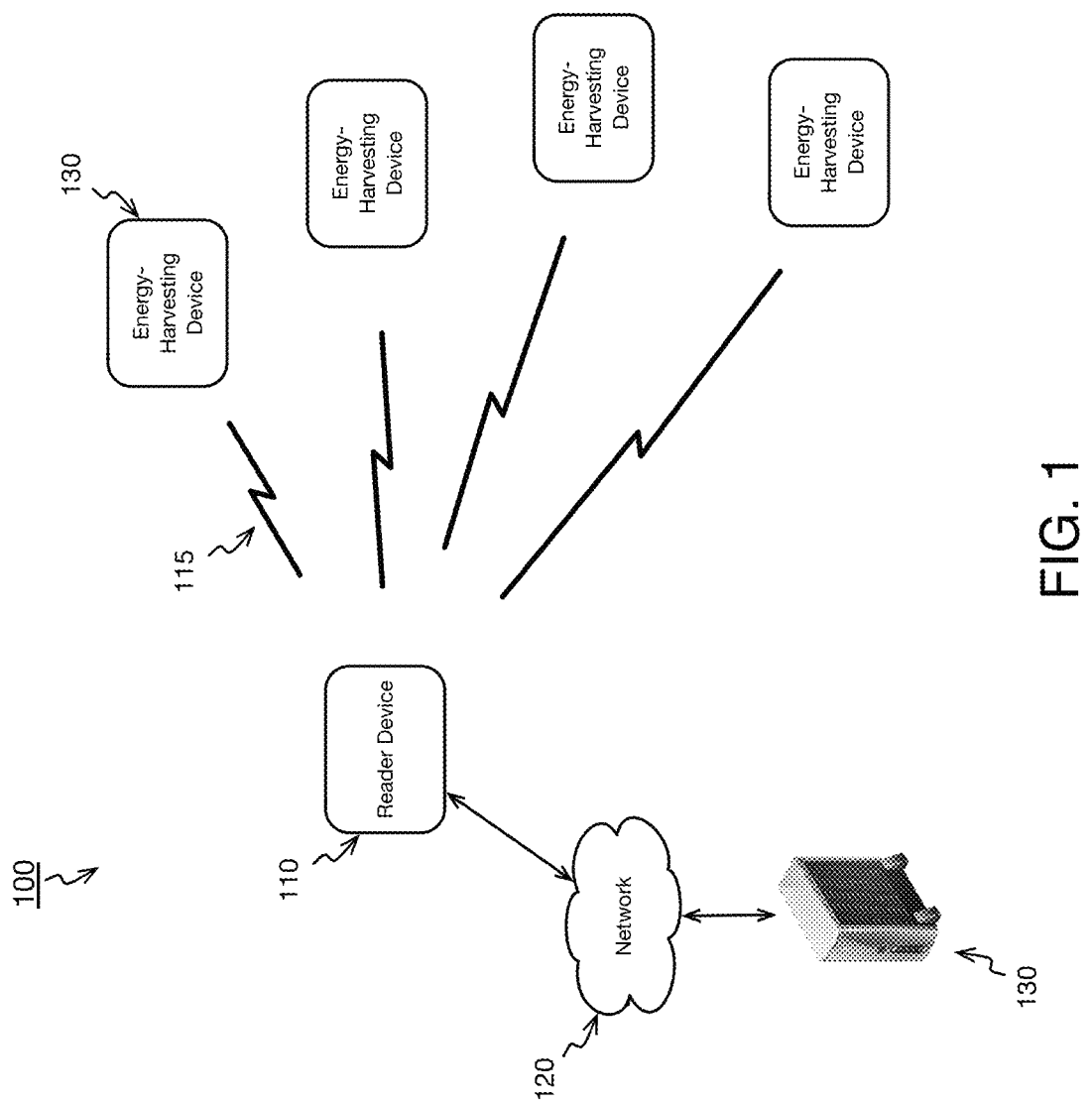
FIG. 1 is a system diagram illustrating certain features of a system containing one or more energy-harvesting devices, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

As mentioned, evolution of the so-called Internet-of-Things (IoT) is expected to deploy a great many (e.g., millions, billions, trillions, etc.) of devices including wireless and/or battery-less devices such as, for example, computational radio frequency identification (C-RFID) tags, battery-less sensors and/or the like. In particular implementations, processing circuits of such wireless and/or battery-less devices may be powered, at least in part, by intermittent radio frequency (RF) energy, intermittent light energy or intermittent acoustical energy, or a combination thereof, collected at the wireless and/or battery-less devices. Wireless and/or battery-less devices such as IoT-type devices may also receive signals and/or signal packets via amplitude-modulated wireless signals, such as amplitude-modulated RF signals, for example. Demodulating amplitude-modulated wireless signals and/or signal packets at wireless and/or battery-less devices may pose significant challenges, as explained more fully below.

FIG. 1 is a schematic diagram illustrating certain features of a system 100 containing a number of wireless and/or battery-less energy-harvesting devices 130, in accordance with an implementation. In the currently illustrated example, a reader device 110 may transmit RF signals 115, for example, to one or more energy-harvesting devices 130. In an implementation, the energy of RF signals 115 may be harvested, collected and/or stored, for example, at an energy-harvesting device 130. In some implementations, energy-harvesting device 130 may reflect and/or backscatter a portion of RF signals 115 back to reader device 110 and/or may modulate the reflected and/or backscattered portion of RF signals 115 to indicate particular detectable symbols and/or parameters (e.g., an identifier of an object associated with and/or co-located within an energy-harvesting device 130).

Additionally, energy-harvesting device 130 may harvest and/or collect energy received from RF signal 115 for use in powering one or more subsystems of energy-harvesting device 130 (e.g., one or more processors, microprocessors, memory, sensors, transceiver devices, display devices, etc., not shown). For example, energy-harvesting device 130 may include one or more antennae, resonating circuitry and/or structures, charge pumps, charge storage devices (e.g., capacitors) and/or the like to harvest and/or collect energy from a portion of RF signal 115 received at energy-harvesting device 130.

In an embodiment, reader device 110 and energy-harvesting device 130 may communicate bidirectionally. For example, reader device 110 may amplitude-modulate baseband signals and/or signal packets and may transmit amplitude-modulated wireless signals and/or signal packets (e.g., RF signal 115) to energy-harvesting device 130. Energy-harvesting device 130 may transmit messages to reader device 110 in an uplink signal. In one example, an uplink signal may comprise, for example, a signal indicating and/or expressing an identifier of a corresponding energy-harvesting device 130 and/or object co-located with such a corresponding energy-harvesting device 130. In an embodiment, an uplink signal may comprise a reflection of RF signal 115 that has been modulated with parameters and/or symbols to be detected and/or recovered at reader device 110. In particular implementations, reader device 110 and energy-harvesting devices 130 may exchange wireless signals and/or signal packets according to one or more signal messaging formats set forth in one or more ISO/IEC 18000 conventions, for example, although subject matter is not limited in scope in this respect. In other examples in which an energy-harvesting device 130 may comprise more advanced sensing and/or processing capabilities, uplink signals may comprise more robust messaging such as, for example, sensor measurements and/or values computed based, at least in part, on sensor measurements. Also, in an implementation, reader device 110 may comprise a single board computer hosting a real-time operating system (e.g., Linux) to enable, for example, Internet access (e.g., via network 120 and/or server computing device 130) and/or to perform device management.

As mentioned, a device, such as reader device 110, may transmit signals and/or signal packets to energy-harvesting device 130 via an amplitude-modulated wireless signal, such as RF signal 115. Baseband signals and/or signal packets transmitted via amplitude-modulated wireless signals (e.g., RF signal 115) may be demodulated at energy-harvesting device 130 to extract the baseband signals and/or signal packets. As explained more fully below, demodulation of an amplitude-modulated signal may include detecting rising and/or falling of an envelope of the amplitude-modulated signal (e.g., RF signal 115). Baseband signals and/or signal packets may be reconstructed at a receiving device (e.g., energy-harvesting device 130) based at least in part on the detected envelope of the amplitude-modulated signal, for example. As utilized herein, "baseband signal," "baseband signal packet" and/or the like refer to signals and/or signal packets communicated without modulation.

In some circumstances, demodulation of an amplitude-modulated wireless signal (e.g., RF signal 115) may pose challenges due at least in part to, for example, a power level at which reader device 110 transmits RF signal 115 and/or other factors including, for example, a range and/or distance between reader device 110 and energy-harvesting device 130, deviations from line-of-sight transmissions, presence of multi-path, presence of RF shadows from other energy-harvesting devices 130, movement of energy-harvesting devices 130, just to provide a few examples of such additional factors. For example, RF power may decay less over shorter distances and may decay to a greater degree over longer distances. Such differences in RF power and/or other circumstances may result in a variety of different envelope characteristics for amplitude-modulated wireless signals received at different energy-harvesting devices 130. It may prove challenging to design an envelope detector circuit to adequately and/or appropriately function over such varying circumstances, for example. Adding to the challenges of designing and/or implementing amplitude-modulated signal detection circuits is that energy-harvesting devices, such as energy-harvesting devices 130, may tend to be relatively simple, lower cost devices having relatively simple protocols and/or relatively simple circuits.

In the particular example depicted in FIG. 1, for simplicity of illustration system 100 includes multiple energy-harvesting devices 130 to receive an RF signal 115 from a single reader device 110. It should be understood that in other implementations, an energy-harvesting device 130 may communicate with and/or receive an RF signal from multiple different reader devices 110. Also, although particular example implementations discussed herein may be directed to use of RF signals, it should be understood that an RF signal is merely an example wireless signal type and that other implementations may utilize different types of wireless signals to communicate signals and/or signal packets. For example, in some implementations, amplitude-modulated wireless signals may comprise RF signals, light signals (e.g., infra-red) and/or acoustical signals, just to provide a few examples.

Herein, "transponder," "transponder device," "tag," "tag device," "receiver," "receiver device," "sensor," "sensor device," "RFID," "energy-harvesting device" and/or the like refer to a device having capabilities to harvest RF energy and/or to receive and/or demodulate amplitude-modulated wireless signals and/or signal packets. Herein, "transponder," "transponder device," "tag," "tag device," "receiver," "receiver device," "sensor," "sensor device," "RFID," "energy-harvesting device" and/or the like may be used interchangeably. In some implementations, a sensor device and/or energy-harvesting device may comprise an IoT-type device, although subject matter is not limited in scope in this respect. Also, herein, "transmitter," "transmitter device," "reader," "reader device" and/or the like refer to devices having a capability to transmit wireless signals and/or signal packets and/or to obtain acknowledgment of receipt of wireless signal packets from receiver devices. "Transmitter," "transmitter device," "reader," "reader device" and/or the like may be utilized interchangeably herein.

Further, in this context, "IoT-type device," "IoT-type devices" and/or the like refer to one or more electronic and/or computing devices capable of leveraging existing Internet or like infrastructure as part of the so-called "Internet of Things", or IoT, such as via a variety of applicable protocols, domains, applications, etc. IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction. In implementations, energy-harvesting devices 130 may comprise IoT-type devices, for example, that may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet devices, PCs, personal audio or video devices, personal navigation devices, and/or the like, to name a few non-limiting examples. In some implementations, energy-harvesting devices 130, including IoT-type devices, for example, may be capable of being uniquely identified via an assigned Internet Protocol (IP) address, as one particular example.

Figure 2:
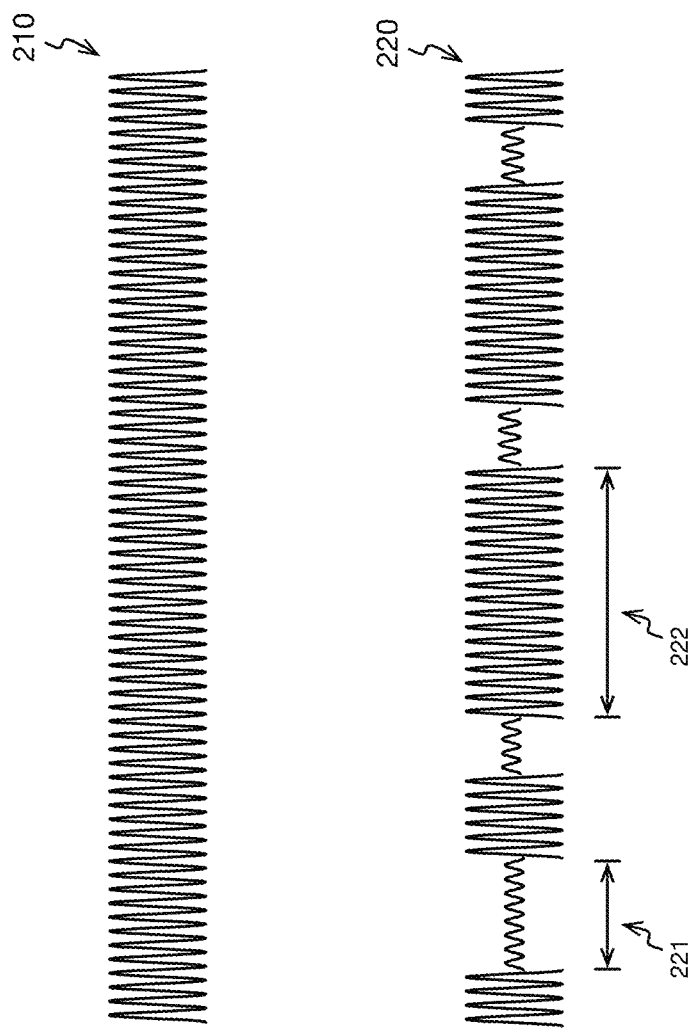
FIG. 2 is a diagram illustrating an example amplitude-modulated wireless signal, in accordance with an embodiment.

FIG. 2 is a diagram illustrating an example amplitude-modulated wireless signal. In some implementations, a transmitting device, such as reader device 110, may begin a transmission of an amplitude-modulated wireless signal with a continuous (e.g., over a specified period of time) wave in a higher-power state, such as indicated at 210 of FIG. 2. Further, a transmitting device, such as reader device 110, may begin alternating periods of higher-power states (e.g., higher-power phases 222) and reduced-power states (e.g., lower-power phases 221) during transmission of an amplitude-modulated wireless signal (e.g., to signify logical "1s" and "0s"). In an implementation, a particular pattern of higher and/or lower power states for an amplitude-modulated wireless signal may depend at least in part on a baseband signal and/or signal packet to be communicated and/or at least in part on a particular communications protocol (e.g., GEN2 protocol). In some circumstances, detection of transitions between lower-power phases and higher-power phases (e.g., envelope) of an amplitude-modulated wireless signal may prove challenging, as mentioned. Similarly, design and/or implementation of circuitry to adequately and/or appropriately detect an envelope of an amplitude-modulated wireless signal over a wide range of conditions and/or circumstances may be challenging, particularly considering the lower cost, reduced complexity, untethered and/or battery-less characteristics of many energy-harvesting devices, for example.

Figure 3:
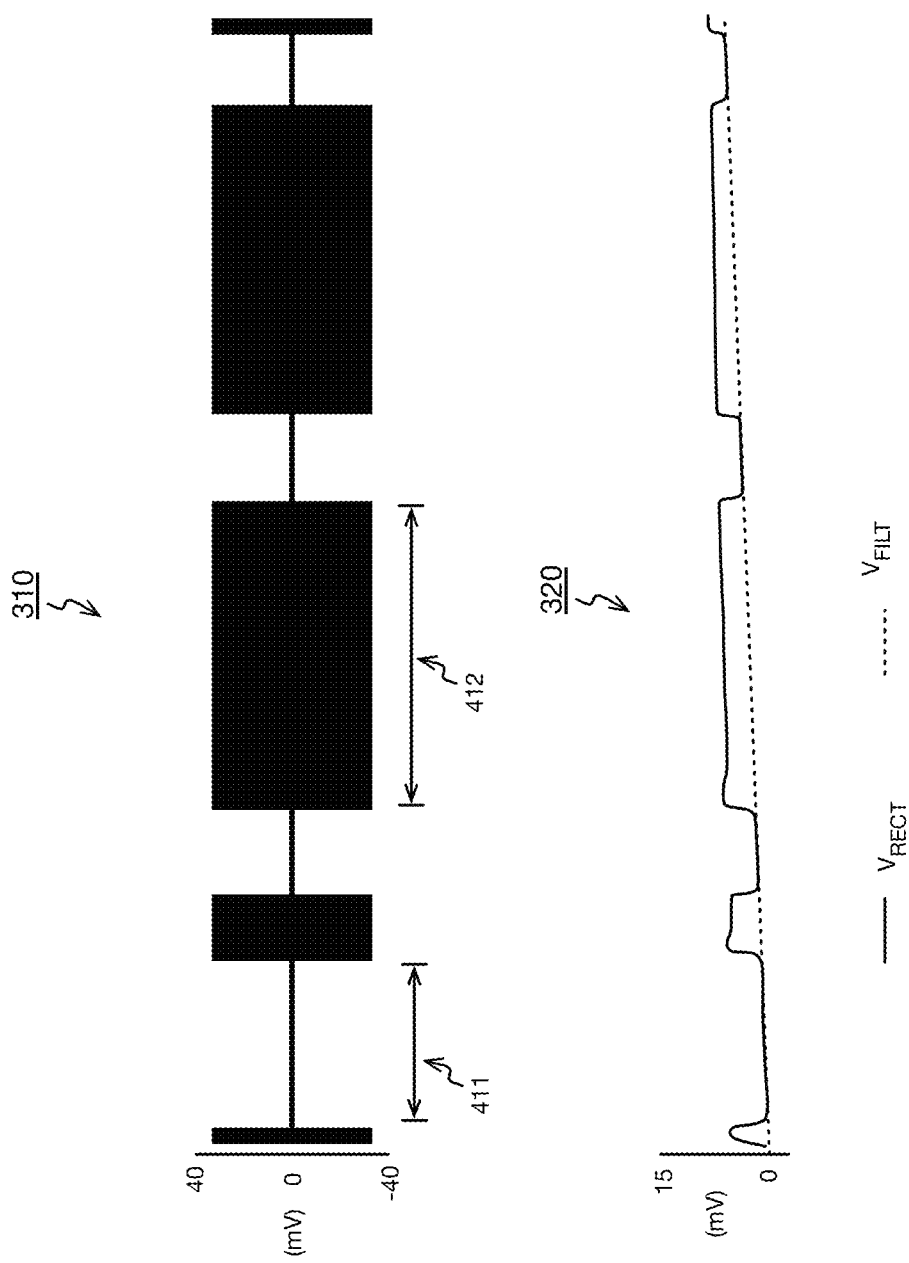
FIG. 3 is a diagram illustrating example amplitude-modulated signal detection circuit signals.

FIG. 3 is a diagram illustrating an example amplitude-modulated wireless signal and example detection circuit signals. For example, waveform 310 depicts an RF signal similar to RF signal 220. Amplitude-modulated RF signal 310 may exhibit phases of lower RF power (e.g., phase 311) and may also exhibit phases of higher RF power (e.g., phase 312), for example. As discussed more fully below in connection with FIG. 4, amplitude-modulated signal detection circuits, such as example circuits 410 and/or 420 depicted in FIG. 4, may provide a rectified signal (e.g., signal $V_{RECT}$) to a first input of an envelope detector/comparator circuit (e.g., envelope detector/comparator 414 and/or 424) and may also provide a filtered (e.g., low-passed) version of the rectified signal (e.g., signal $V_{FILT}$) to a second input of the envelope detector/comparator circuit. FIG. 3 depicts an example waveform 320 showing example $V_{RECT}$ and $V_{FILT}$ signals that may be produced by some amplitude-modulated signal detection circuits, such as example circuits 410 and/or 420, based on RF signals, such as RF signal 310, received at an energy-harvesting device. It may be noted that for example waveform 320 $V_{RECT}$ may not cross below $V_{FILT}$ which may result in an envelope detector/comparator interpreting the voltages provided to its inputs as a logical "1" regardless of the intended value. Example waveforms 320 are provided to demonstrate possible difficulties that may arise for some amplitude-modulated wireless signal detection circuits under adverse RF signal conditions.

Also, although some amplitude-modulated signal detection circuits, such as example circuits 410 and/or 420, may provide a rectified signal to an input of an envelope detector/comparator, it may be difficult for such circuits to completely remove all of a carrier wave ripple from the rectified signal. Thus, there may exist a higher-frequency ripple voltage within a rectified signal that may cause relatively small variations in timing (e.g., dynamic hysteresis) that may interfere with proper envelope detection. Further, because energy-harvesting devices 130 may vary in proximity to an RF transmitting device, such as reader device 110, a relatively large variation in common mode voltage at the inputs of an envelope detector/comparator in some amplitude-modulated signal detection circuits, such as example circuits 410 and/or 420, may be realized depending at least in part on how a distance may vary between a particular energy-harvesting device 130 and a particular RF transmitting device. Such a variation in common-mode voltage may have an adverse effect on device reliability and/or performance and may add to the challenges of designing and/or implementing amplitude-modulated signal detection circuits that may operate reliably across a wide range of operating conditions and/or circumstances.

Figure 4:
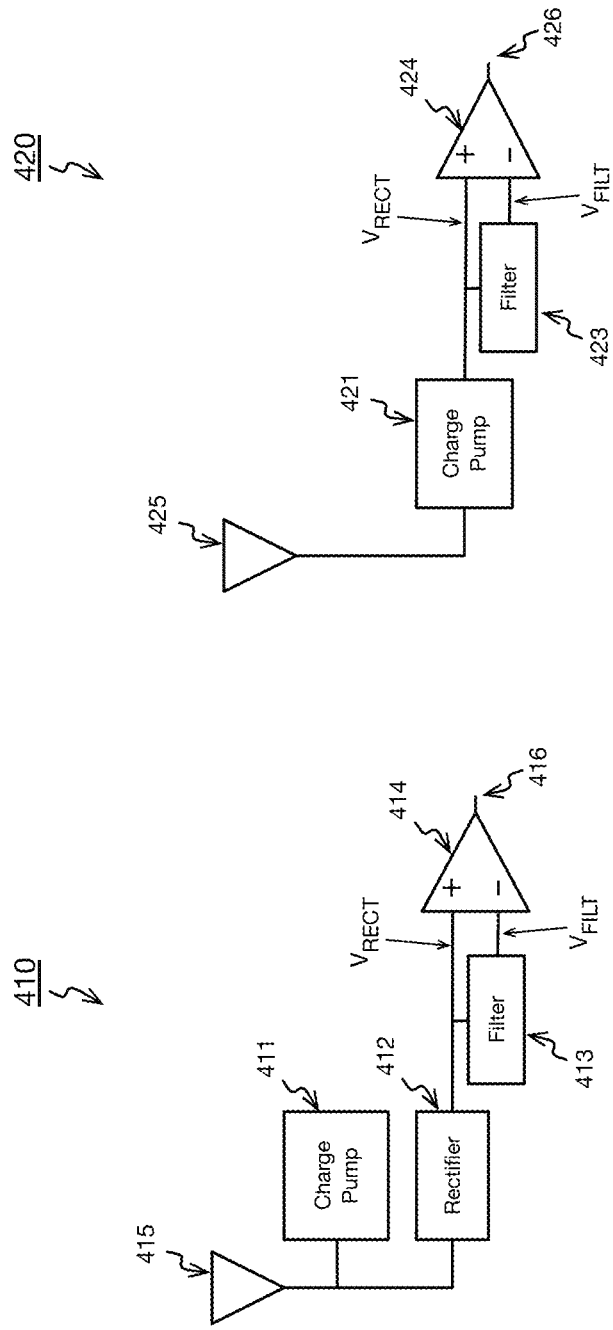
FIG. 4 is a schematic block diagram illustrating example amplitude-modulated signal detection circuits.

FIG. 4 is a schematic block diagram illustrating example amplitude-modulated signal detection circuits 410 and 420. As mentioned above and as explained more fully below, amplitude-modulated signal detection circuits 410 and/or 420 may have some significant drawbacks and/or disadvantages.

Amplitude-modulated signal detection circuit 410, for example, may be implemented on a separate integrated circuit die within an energy-harvesting device 130. Circuit

410 may include an antenna 415 to receive an amplitude-modulated wireless signal, such as RF signal 115, for example. A charge pump 411 may develop a power voltage signal from RF signal 115 that may be utilized to power circuitry within energy-harvesting device 130. For example circuit 410, charge pump 411 may be modeled as having a voltage-gain $G_k$ and a time-constant $\tau_k$, wherein $\tau_k$ may be based at least in part on output capacitance and/or loading of charge pump 411.

Also, for example circuit 410, a signal rectifier circuit 412 may produce an envelope from an RF signal 115. A transfer function for rectifier circuit 412 may be modeled as abs*f($\tau_{rec}$t), wherein abs represents an absolute function and wherein f($\tau_{rect}$) represents a function of a time constant $\tau_{rect}$ determined by an equivalent resistance and/or capacitance for rectifier circuit 412. As depicted in FIG. 4, rectifier circuit 412 may provide a signal $V_{RECT}$ to a first input terminal of envelope detector/comparator 414.

Additionally, circuit 410 may include a filter circuit 413 that may present a filtered (e.g., low-passed) version of signal $V_{RECT}$ to a second input terminal of envelope detector/comparator 414. A transfer function for filter circuit 413 may be modeled as f($\tau_{filt}$) which may represent a function of a time constant $\tau_{filt}$ determined by one or more characteristics of filter circuit 413, for example. Based at least in part on the different characteristics of the signals presented to the first input (e.g., "+") and the second input ("−"), envelope detector/comparator 414 may generate a demodulated/baseband signal 416.

As mentioned, example amplitude-modulated signal detection circuit 410 may have some significant drawbacks and/or disadvantages. For example, such an implementation may be incompatible with complementary metal-oxide semiconductor (CMOS) technology in at least some circumstances. Also, for example, circuit 410 may rely on off-chip (e.g., located on a different integrated circuit die than other circuits of energy-harvesting device 130) passive components. Further, signal rectifier circuit 412 may be implemented at least in part utilizing passive diodes, for example, that may not operate as designed without relatively higher RF signal amplitudes. Additionally, circuit 410 may be implemented at least in part utilizing fixed-value passive components that may not have an ability to adapt to the range of possible RF signal amplitudes that may be experienced by a deployed energy-harvesting device 130.

Example amplitude-modulated signal detection circuit 410 may also be implemented "on-chip" (e.g., same integrated circuit die as other circuitry of energy-harvesting device 130). An on-chip implementation of circuit 410 may comprise similar characteristics as those discussed above and may therefore also include some of the same drawbacks and/or disadvantages. However, an on-chip implementation may be CMOS-compatible and also may not utilize off-chip passive components. A relatively lower RF signal amplitude specification may also be an advantageous characteristic of an on-chip implementation of circuit 410. However, despite these potential advantages over an off-chip implementation, an on-chip implementation of circuit 410 may still have some drawbacks and/or disadvantages. For example, an on-chip implementation may be limited to utilization of on-chip passive components for filter circuit 413. Further, for example, utilization of fixed-value passive components may provide no ability to adapt a time constant $\tau_{filt}$ for filter circuit 413 for different conditions, such as for different RF signal amplitudes. Additionally, a lack of a voltage-multiplier (e.g., such as may be provided by a charge pump circuit) within rectifier circuit 412 may result in a relatively lower common-mode input voltage at envelope detector/comparator 414. Such a relatively lower common-mode input voltage may necessitate additional design and/or implementation complexity as compared with circuits that provide a relatively higher common-mode input voltage (e.g., see example amplitude-modulated signal detection circuit 500 discussed below).

Example amplitude-modulated signal detection circuit 420 depicted in FIG. 4 may also comprise an on-chip detection circuit. Although differing in some respects from example circuit 410, example circuit 420 may include some characteristics similar to those discussed above in connection with circuit 410. For example, circuit 420 may include an antenna 425 and may further include an envelope detector/comparator 424. Also, similar to circuit 410, the two inputs of envelope detector/comparator 424 may be provided with a $V_{RECT}$ signal and a version of $V_{RECT}$ provided by a filter 423. However, for circuit 420, $V_{RECT}$ may be provided by a charge pump 421. For example, charge pump 421 may comprise characteristics similar to charge pump 411 of circuit 410. Charge pump 421 may provide a signal voltage-multiplication function to increase common-mode voltage at envelope detector/comparator 424, thereby addressing, at least in part, a potential drawback and/or disadvantage of example circuit 410. However, example circuit 420 may still have drawbacks and/or disadvantages including, for example, a restriction to the utilization of on-chip passive components for filter circuit 423 and/or utilization of fixed-value passive components providing no ability to adapt a time constant $\tau_{filt}$ for filter circuit 423 for different conditions, such as for different RF signal amplitudes. Also, utilization of charge pump 421 in the RF signal path may result in a time constant $\tau_k$ for the "+" input of envelope detector/comparator 424 being determined by the fixed characteristics of charge pump 421 which may reduce design flexibility for filter circuit 423, for example. Additionally, presence of a filter circuit, such as filter circuit 423, on a signal path may result in an increase in power consumption in some circumstances due at least in part to signal loss through the filter circuit (e.g., some signal may be diverted to a ground reference voltage).

Figure 5:
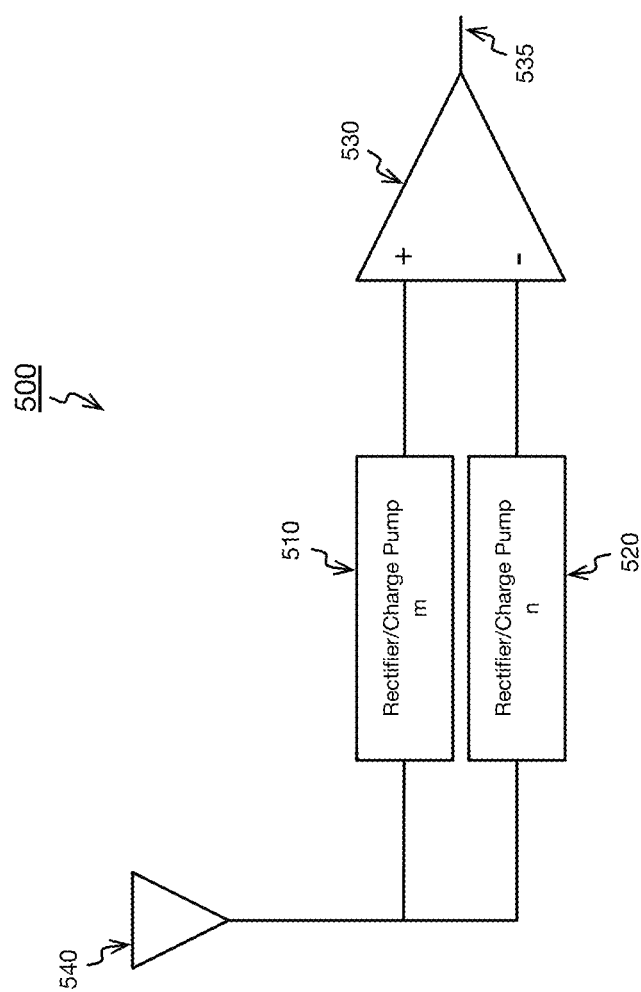
FIG. 5 is a schematic block diagram illustrating an example amplitude-modulated signal detection circuit including signal charge pumps, in accordance with an embodiment.

FIG. 5 is a schematic block diagram illustrating an embodiment 500 of an example amplitude-modulated signal detection circuit including signal charge pumps 510 and 520. Example amplitude-modulated signal detection circuit 500 is meant to address, at least in part, the aforementioned drawbacks and/or disadvantages of other amplitude-modulated signal detection circuits, such as circuits 410, 420 and/or the like. Implementations of amplitude-modulated signal detection circuits described herein, such as amplitude-modulated signal detection circuit 500, are directed to enabling longer-range, longer-life energy harvesting devices, for example.

To enable longer-range operation, sensitivity may be a criterion. In some circumstances, increased sensitivity may be achieved at the cost of increased power consumption. Implementations described herein, however, may improve sensitivity and/or longer-range performance in energy-harvesting devices with a reduced negative impact on power consumption, for example. In particular implementations, RF receiver/demodulator sensitivity may be improved via the use of differential charge pump/rectifier circuits for envelop detection, for example.

In an implementation, amplitude-modulated signal detection circuit 500 may include an m-stage signal charge pump/rectifier circuit 510 and may also include an n-stage signal charge pump/rectifier circuit 520. In an implementation, m>n. In an implementation, a transfer function for m-stage charge pump 510 may be modeled as abs*$G_m$*$f(\tau_m)$, wherein $G_m$ represents a voltage-gain characteristic of m-stage charge pump 510 and/or wherein $\tau_m$ represents a time constant for m-stage charge pump 510. Similarly, a transfer function for n-stage charge pump 520 may be modeled as abs*$G_n$*$f(\tau_n)$, wherein $G_n$ represents a voltage-gain characteristic of n-stage charge pump 520 and/or wherein $\tau_n$ represents a time constant for n-stage charge pump 510.

In an implementation, signal charge pumps 510 and 520 may individually comprise respective and different voltage-gain characteristics due at least in part to the two different charge pumps having different numbers of stages of charge pump circuitry, as explained more fully below. For example, in an implementation, m>n which may result in m-stage charge pump 510 having a larger voltage-gain as compared with n-stage charge pump 520. Therefore, an amplitude-modulated RF signal received at antenna 540 may be rectified and/or amplified by charge pumps 510 and 520 according to the individual characteristics of the respective charge pumps, in an implementation. Differing characteristics of charge pump 510 and/or charge pump 520 may result in differing characteristics of signals applied to the "+" and "−" inputs of envelope detector/comparator 530, for example. In an implementation, envelope detector/comparator 530 may generate a demodulated signal 535 based at least in part on the signals provided to envelope detector/comparator 530 by charge pumps 510 and 520.

In addition to differing voltage-gain characteristics, m-stage charge pump 510 and/or n-stage charge pump 520 may also have differing polarity and/or time constant characteristics. For example, a frequency response bandwidth for m-stage charge pump 510 may be greater than that for n-stage charge pump 520 in an implementation.

In implementations, charge pump/rectifier circuits, such as charge pump 510 and/or charge pump 520, may comprise a Dickson topology utilizing Schottky diodes and/or diode-connected metal oxide semiconductor field-effect transistors (MOSFETs), for example. In an implementation, for an m-stage charge pump circuit, such as charge pump 510, an output voltage Vo and an output impedance Zo may be specified at least in part in terms of a number M of stages, as shown in relations (1) and (2) below.

$$V_O = M\left(\frac{C_C}{C_C + C_{par}} V_{RF}\right) \quad (1)$$

$$Z_O = M\left(\frac{1}{2\pi f_{RF}(C_C + C_{par})}\right) \quad (2)$$

wherein $C_c$ and $C_{par}$ represent a coupling capacitance and a parasitic capacitance, respectively. In implementations, such as under relatively lighter loads, for example, a charge pump/rectifier circuit's (e.g., charge pump circuits 510, 520, etc.) gain and/or bandwidth characteristics may be controlled, at least in part, by specifying different numbers of stages M. In this manner, for example, the differing characteristics of charge pump circuits having different numbers of stages may be utilized to amplify an envelope signal and/or to avoid filter circuits.

In an implementation, due at least in part to the voltage-gain characteristics for charge pump 510 and/or charge pump 520, a higher common-mode voltage may be achieved at the inputs of envelope detector/comparator 530, for example. Further, in an implementation, due at least in part to the different bandwidth characteristics of charge pump 510 and/or charge pump 520, switching characteristics of the signals applied to the inputs of envelope detector/comparator 530 may be such that envelope detection may be simplified and/or may be made more reliable.

Figure 6:
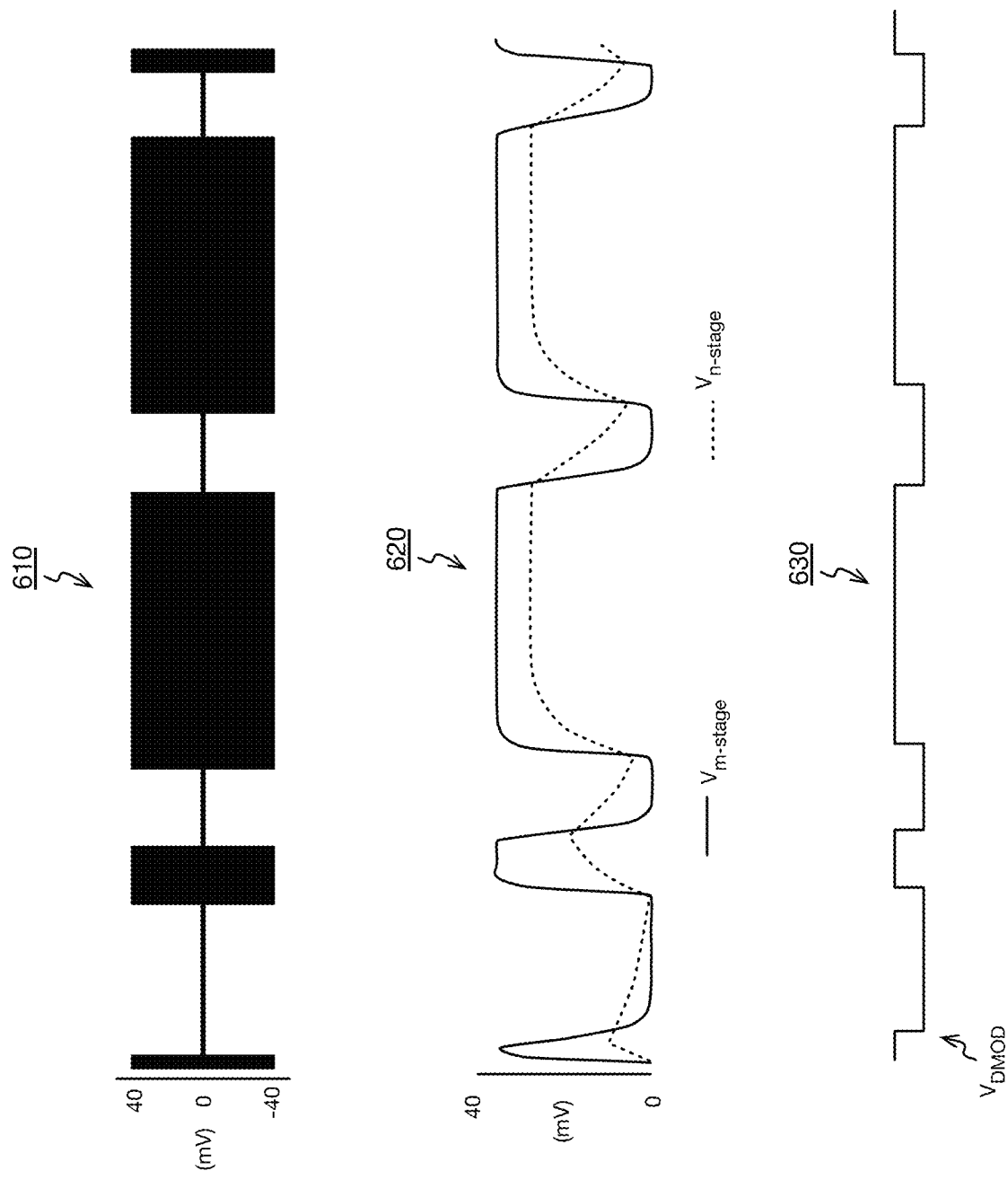
FIG. 6 is a diagram illustrating example amplitude-modulated wireless signal detection circuit signals, in accordance with an embodiment.

For example, FIG. 6 is a diagram illustrating example waveforms depicting an example RF signal 610, example comparator input signals $V_{m\text{-}stage}$ and $V_{n\text{-}stage}$ and an example demodulated signal 630. It may prove beneficial to compare example waveforms 620 showing example comparator input signals $V_{m\text{-}stage}$ and $V_{n\text{-}stage}$ with example waveforms 320 depicted in FIG. 3. For example, enhanced voltage-gain characteristics, and thus higher common-mode input voltage, for comparator input signals $V_{m\text{-}stage}$ and $V_{n\text{-}stage}$ as compared with comparator input signals $V_{rect}$ and $V_{filt}$ may be observed. Also, for example, the different bandwidth characteristics for comparator input signals $V_{m\text{-}stage}$ and $V_{n\text{-}stage}$ can be seen to contribute to the higher common-mode input voltage for example waveforms 620 as compared with example waveforms 320.

Further, in an implementation, amplitude-modulated signal detection circuit 500 may provide additional advantages over other circuits, such as circuits 410 and/or 420. For example, because m-stage charge pump 510 and n-stage charge pump 520 have different time-constant characteristics, and thus different bandwidth characteristics, there may be no need to implement a filter circuit, such as filter circuits 413 and/or 423. Also, in an implementation, the time constants of charge pump 510 and/or charge pump 520 may be tunable, adjustable, configurable, etc. in order to adapt amplitude-modulated signal detection circuit 500 for different amplitudes of RF signals and/or to adapt to other conditions and/or circumstances, for example.

In testing and/or simulations of a particular implementation of an amplitude-modulated signal detection circuit in accordance with one or more embodiments, such as amplitude-modulated signal detection circuit 500 comprising charge pump/rectifier circuits 510 and/or 520, for example, an RF signal packet was observed to be correctly demodulated at a measured received RF signal power of −8 dBm (e.g., measured using NRP18S RF power probe) by an implementation utilizing passive filter technologies (e.g., such as circuits 410 and/or 420) and by an implementation based on embodiments described herein, such as such as amplitude-modulated signal detection circuit 500. However, at a received RF signal power of −11 dBm, the passive filter scheme was seen to fail to correctly demodulate the received RF signal packet while an implementation based on embodiments described herein, such as amplitude-modulated signal detection circuit 500 comprising charge pump/rectifier circuits 510 and/or 520, for example, was observed to successfully demodulate the received RF signal packet. In other test and/or simulation results, an implementation based on embodiments described herein, such as amplitude-modulated signal detection circuit 500 comprising charge pump/rectifier circuits 510 and/or 520, for example, was observed to provide a 9 dB improvement in receive sensitivity over a passive filter scheme (e.g., such as circuits 410 and/or 420). Additionally, testing and/or simulation results demonstrate that an implementation based on embodiments described herein, such as amplitude-modulated signal detection circuit 500 comprising charge pump/rectifier circuits 510 and/or 520, for example, may outperform passive filter schemes (e.g., such as circuits 410 and/or 420) for both amplitude-shift key (ASK) and phase-reversal amplitude-shift key (PR-ASK) modulation schemes.

Figure 7:
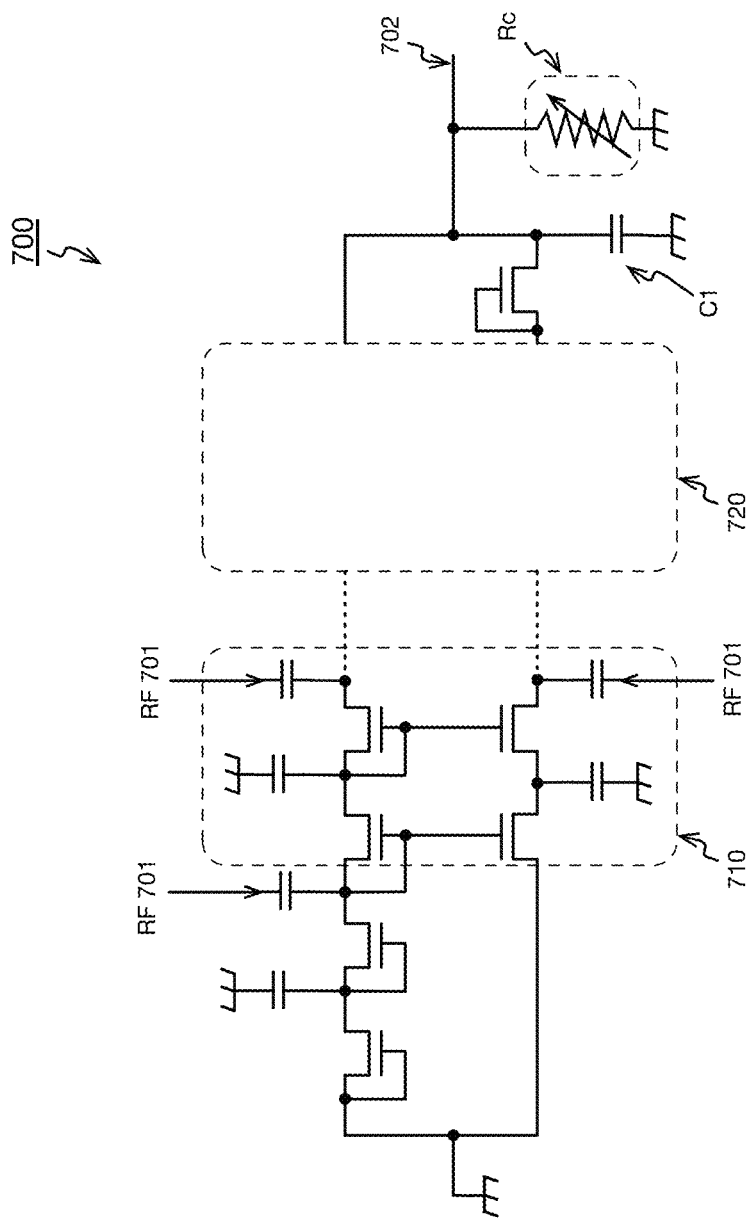
FIG. 7 is a schematic block diagram illustrating an example signal charge pump, in accordance with an embodiment.

FIG. 7 is a schematic block diagram illustrating an embodiment 700 of an example signal charge pump/rectifier circuit. In an implementation, signal charge pump 700 may be utilized to implement m-stage charge pump 510 and/or n-stage charge pump 520, for example. In an implementation, an individual charge pump stage, such as stage 710, may include four transistors and/or four capacitors. However, this is merely an example charge pump stage, and subject matter is not limited in scope in these respects.

As depicted in FIG. 7, an RF signal 701 may be injected into circuit 700. RF signal 701 may be rectified and/or amplified by first charge pump stage 710 and/or by one or more charge pump stages 720 to generate an envelope detector/comparator input signal 702, for example. In an implementation, example circuit 700 may include an output capacitor C1 and a tunable, configurable, adjustable, variable, etc., resistor Rc. In an implementation, Rc may comprise a pull-down resistor, as depicted in FIG. 7. In an implementation, Rc may comprise a plurality of resistors coupled in a substantially series fashion, wherein individual resistors may be bypassed via a respective switching device. In this manner, by opening or closing particular switching devices to bypass particular resistors, a specified value of Rc may be achieved. Of course, this is merely an example of how a tunable, configurable, adjustable, variable, etc., output resistor (e.g., Rc) may be implemented, and subject matter is not limited in these respects.

In an implementation, for an m-stage charge pump, such as m-stage charge pump 510, charge pump stage 720 may represent an $m^{th}$ charge pump stage. Charge pump stages 2 through m−1 are depicted by the broken lines between stage 710 and stage 720, for example. In an implementation, m=6 and n=2. Thus, for example, m-stage charge pump 510 may comprise a six stage charge pump and/or n-stage charge pump 520 may comprise a two stage charge pump. However, again, subject matter is not limited in scope in these respects. For example, m and/or n may comprise any integers wherein m>n.

It may be noted that individual charge pump stages, such as stage 710, may be reused and/or reconfigured. For example, during a design process, a building block of stage 710, for example, may be repeated a suitable number of times to yield desired and/or specified voltage-gain and/or time-constant characteristics for a particular signal charge pump. Also, in an implementation, a number of charge pump stages to be active at a given point in time for a particular charge pump may be programmable, adjustable, configurable, etc. That is, for example, m and/or n may be varied during energy-harvesting device operation to adjust for changing operating conditions. These aspects are explored more fully below.

In an implementation, a transfer function for example charge pump circuit 700 which, as mentioned, may be utilized to implement charge pumps 510 and/or 520, for example, may be modeled as follows. For an m-stage charge pump example, a time-constant $\tau_m$ may be expressed in accordance with relation (3) for a charging phase (e.g., RF signal is ramping up).

$$\tau_m = C1 * \{R_{cp}(m) \| R_c\} \quad (3)$$

wherein Rcp(m) represents an equivalent resistance and a function of a number of stages for the signal charge pump and wherein Rc represents a value of a tunable output resistor.

Further, in an implementation, time-constant $\tau_m$ may be expressed in accordance with relation (4) $\tau\tau_m = C1 * Rc$ for a discharging phase (e.g., RF signal is going down).

$$\tau_m = C1 * Rc \quad (4)$$

To model an n-stage signal charge pump, for example, Rcp(m) and C1 may be replaced with Rcp(n) and C2 (output capacitor of n-stage charge pump), respectively. In an implementation including an m-stage charge pump and an n-stage charge pump providing input signals to an envelope detector/comparator, such as envelop detector/comparator 530, during a charging phase (e.g., transient) Rcp(m)<Rcp(n) and C1<C2 may result in time-constant $\tau_m \ll$ time-constant $\tau_n$, so that an output signal of the m-stage signal charge pump (e.g., output of m-stage charge pump 510) may ramp up much more quickly than an output signal for the n-stage signal charge pump (e.g., n-stage charge pump 520). This may be observed in example waveforms 620 of FIG. 6.

Additionally, in an implementation, during a discharging phase (e.g., transient), Rc for the two charge pumps may be equal are equal and C1<C2 which may yield $\tau_m < \tau_n$. Therefore, an output signal of an m-stage charge pump (e.g., m-stage charge pump 510) may discharge more quickly than an output signal of an n-stage charge pump (e.g., n-stage charge pump 520). Again, this may be readily observed in example waveforms 620 of FIG. 6.

As may be seen with relations 1 and/or 2, tunability of Rc may allow adjustment of time-constants ($\tau_m$ and $\tau_n$) for m-stage and/or n-stage signal charge pumps. Such adjustability and/or tunability may allow for adaptation of an amplitude-modulated signal detection circuit, such amplitude-modulated signal detection circuit 500, to account for different amplitudes of RF signals received at IoT-type devices, such as energy-harvesting devices 130, for example. Additionally, at steady state (e.g., non-transient), because voltage gain $G_m > G_n$ a voltage level for an output signal of an m-stage signal charge pump (e.g., m-stage charge pump 510) may remain greater than a voltage level for an output signal of an n-stage signal charge pump (e.g., n-stage charge pump 520), thereby reducing and/or eliminating fault switching, in an implementation. This characteristic may be viewed in contrast with the more error-prone conditions observed in example waveforms 320 of FIG. 3, for example.

Figure 8:
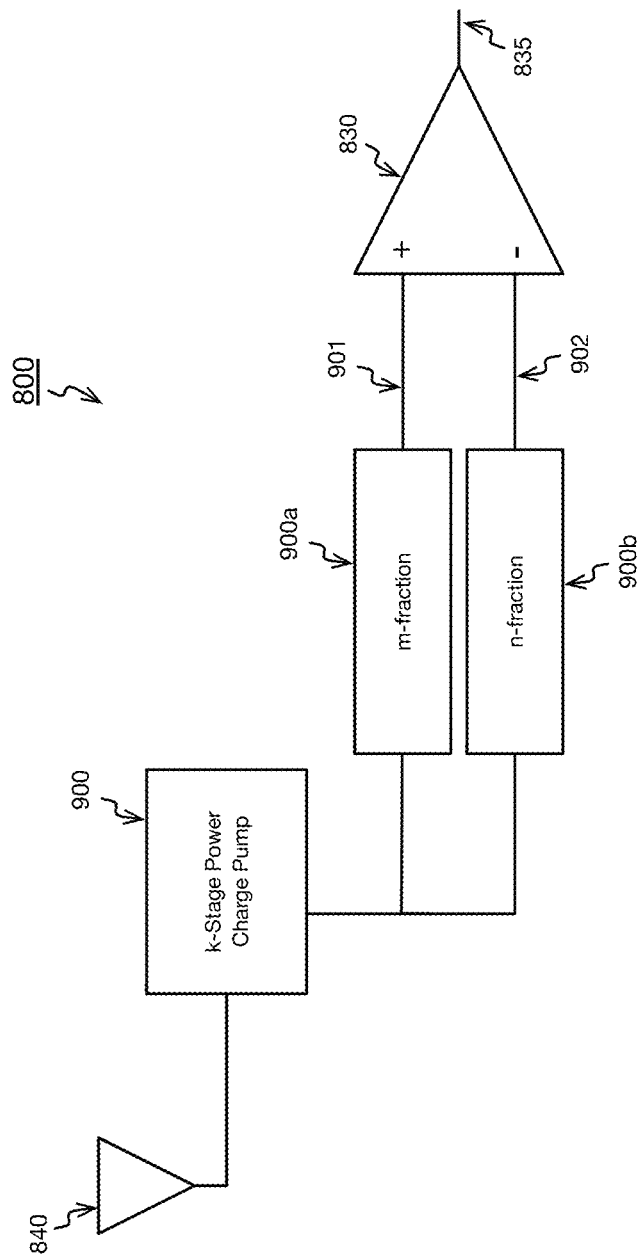
FIG. 8 is a schematic block diagram illustrating an example amplitude-modulated signal detection circuit including a power charge pump and signal charge pumps, in accordance with an embodiment.

FIG. 8 is a schematic block diagram illustrating an embodiment 800 of an example amplitude-modulated signal detection circuit including a power charge pump 900 and signal charge pumps 900a and 900b. As explained more fully below, signal charge pumps 900a and 900b may comprise portions of power charge pump 900, for example. Amplitude-modulated signal detection circuit 800 may include an antenna 840 to receive an amplitude-modulated wireless signal, such as RF signal 115, for example. A k-stage charge pump 900 may develop a power voltage signal from a wireless signal, such as RF signal 115, that may be utilized to power circuitry such as, for example, envelope detector/comparator 830 and/or other circuitry within an energy-harvesting device, such as energy-harvesting device 130. In an implementation, k-stage power charge pump 900 may be modeled according to a voltage-gain $G_k$ and a time-constant $\tau_k$, wherein $\tau_k$ may be based at least in part on output capacitance and/or loading of charge pump 900.

In an implementation, signal charge pump 900a may comprise an "m-fraction" charge pump that may provide a first input signal 901 to envelope detector/comparator 830. Further, in an implementation, signal charge pump 900b may comprise an "n-fraction" charge pump that may provide a second input signal 902 to envelope detector/comparator 830. In an implementation, signals 901 and 902 may respectively comprise internal signals and/or nodes of k-stage power charge pump 900.

In an implementation, an m-fraction internal signal 901 may exhibit a voltage-gain of $G_k/G_m$ and a time constant of $\tau_k/\tau_m$. Further, an n-fraction internal signal 902 may exhibit a voltage-gain of $G_k/G_n$ and a time constant of $\tau_k/\tau_n$, in an implementation. Due at least in part to differing voltage-gain characteristics, differing polarity characteristics and/or differing time constant characteristics of signals 901 and 902, for example, amplitude-modulated signal detection circuit 800 may address at least some of the drawbacks and/or disadvantages of other detection circuits, such as circuits 410 and/or 420. Additionally, amplitude-modulated signal detection circuit 800 may realize similar advantages as those discussed above in connection with amplitude-modulated signal detection circuit 500, for example. Amplitude-modulated signal detection circuit 800 may also provide an advantage of ease-of-design as compared with other solutions.

Figure 9:
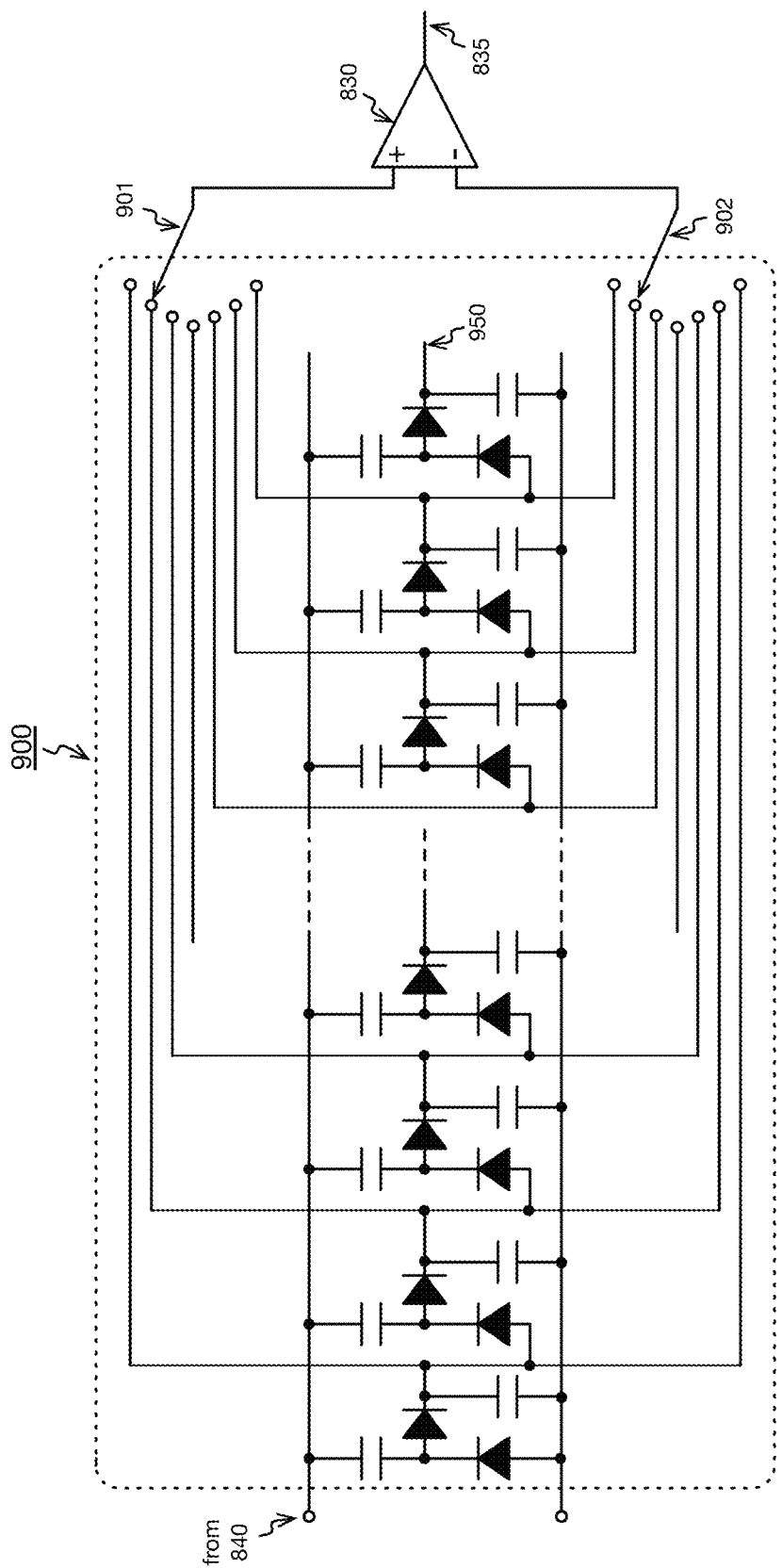
FIG. 9 is a schematic block diagram illustrating an example amplitude-modulated signal detection circuit including multiple configurable charge pump stages, in accordance with an embodiment.

FIG. 9 is a schematic block diagram illustrating an example implementation of k-stage power charge pump 900. In an implementation, charge pump 900 may receive a signal, such as RF signal 115, from antenna 840, for example, and/or may generate a dc power supply signal 950 that may be utilized to power various circuitry in an energy-harvesting device, such as energy-harvesting device 130. Charge pump 900 may also be utilized to provide envelope detector/comparator 830 with input signals 901 and 902, as previously mentioned. For example, different taps (e.g., internal signals and/or nodes) may be selected from k-stage power charge pump 900 for m-fraction signal charge pump 900a and for n-fraction signal charge pump 900b. In an implementation, a particular tap may be dedicated to m-fraction charge pump 900a such that m=6 stages of k-stage power charge pump 900. Further, in an implementation, another particular tap may be dedicated to n-fraction charge pump 900b such that n=2 stages of k-stage power charge pump 900. Of course, subject matter is not limited in scope in these respects.

In another implementation, the particular taps of k-stage power charge pump 900 for m-fraction charge pump 900a and/or n-fraction charge pump 900b may be configurable. For example, amplitude-modulated wireless signal detection circuit 800 may adjust a tap for m-fraction charge pump 900a and/or may adjust a tap for n-fraction charge pump 900b to adjust voltage-gain, polarity and/or bandwidth characteristics to react to changing RF signal conditions and/or environmental conditions.

Figure 10:
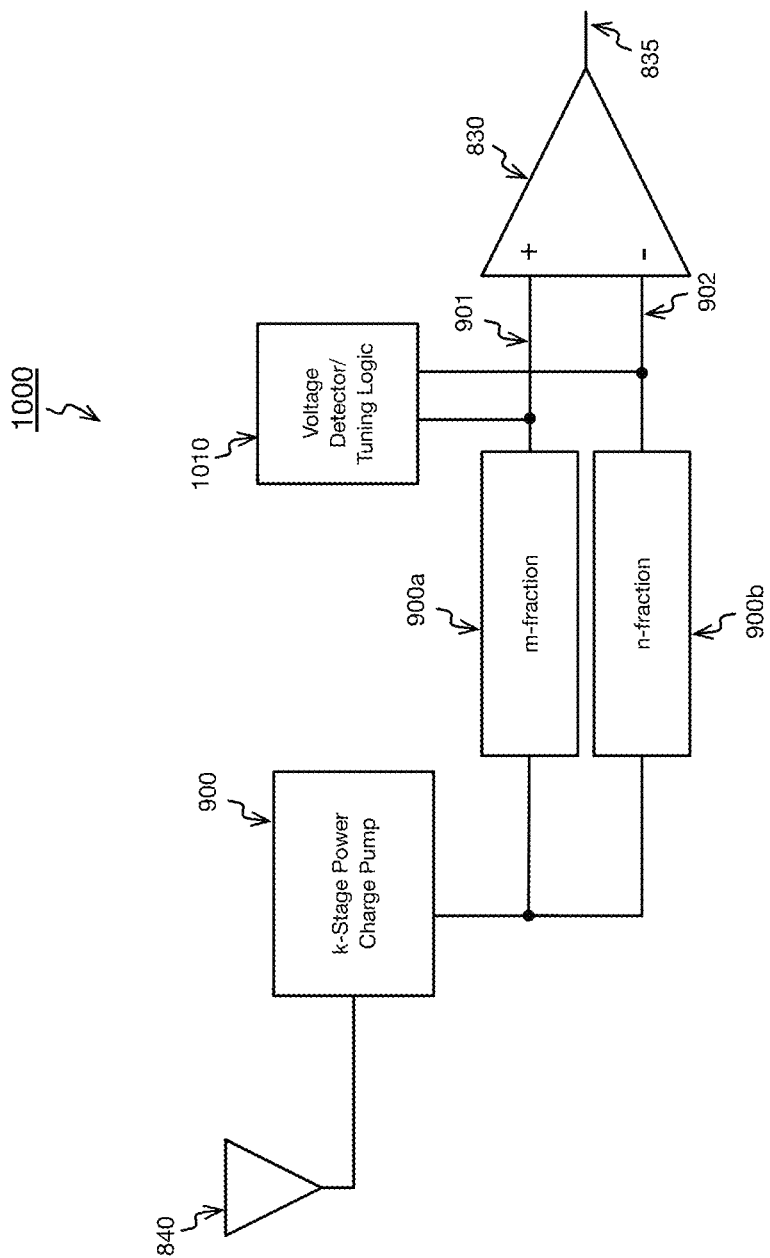
FIG. 10 is a schematic block diagram illustrating an example amplitude-modulated signal detection circuit including power and/or signal charge pumps and also including voltage detection and/or tuning circuitry, in accordance with an embodiment.

FIG. 10 is a schematic block diagram illustrating an embodiment 1000 of an example amplitude-modulated signal detection circuit. In an implementation, amplitude-modulated signal detection circuit 1000 may comprise a number of characteristics similar to those of amplitude-modulated signal detection circuit 800. Additionally, amplitude-modulated signal detection circuit 1000 may include voltage detection and/or tuning circuitry 1010. In an implementation, voltage detection and/or tuning circuitry 1010 may comprise circuitry to automatically adjust a number of stages of k-stage power charge pump 900 to utilize for m-fraction charge pump 900a and/or for n-fraction charge pump 900b. In an implementation, voltage detection and/or tuning circuitry 1010 may adjust a number of charge pump stages to utilize for m-fraction charge pump 900a and/or for n-fraction charge pump 900b based at least in part on a strength of an RF signal received at antenna 840. For example, a number of stages for m-fraction charge pump 900a and/or for n-fraction charge pump 900b may be adjusted to account for changing RF signal conditions, such as a change in a power level at which a transmitting device transmits an RF signal, a change in distance between the transmitting device and a receiving device, such as energy-harvesting device 130, deviations from line-of-sight transmissions, presence of multi-path, presence of RF shadows from other energy-harvesting devices 130, movement of energy-harvesting device 130, temporary interference of RF signal, etc.

Figure 11:
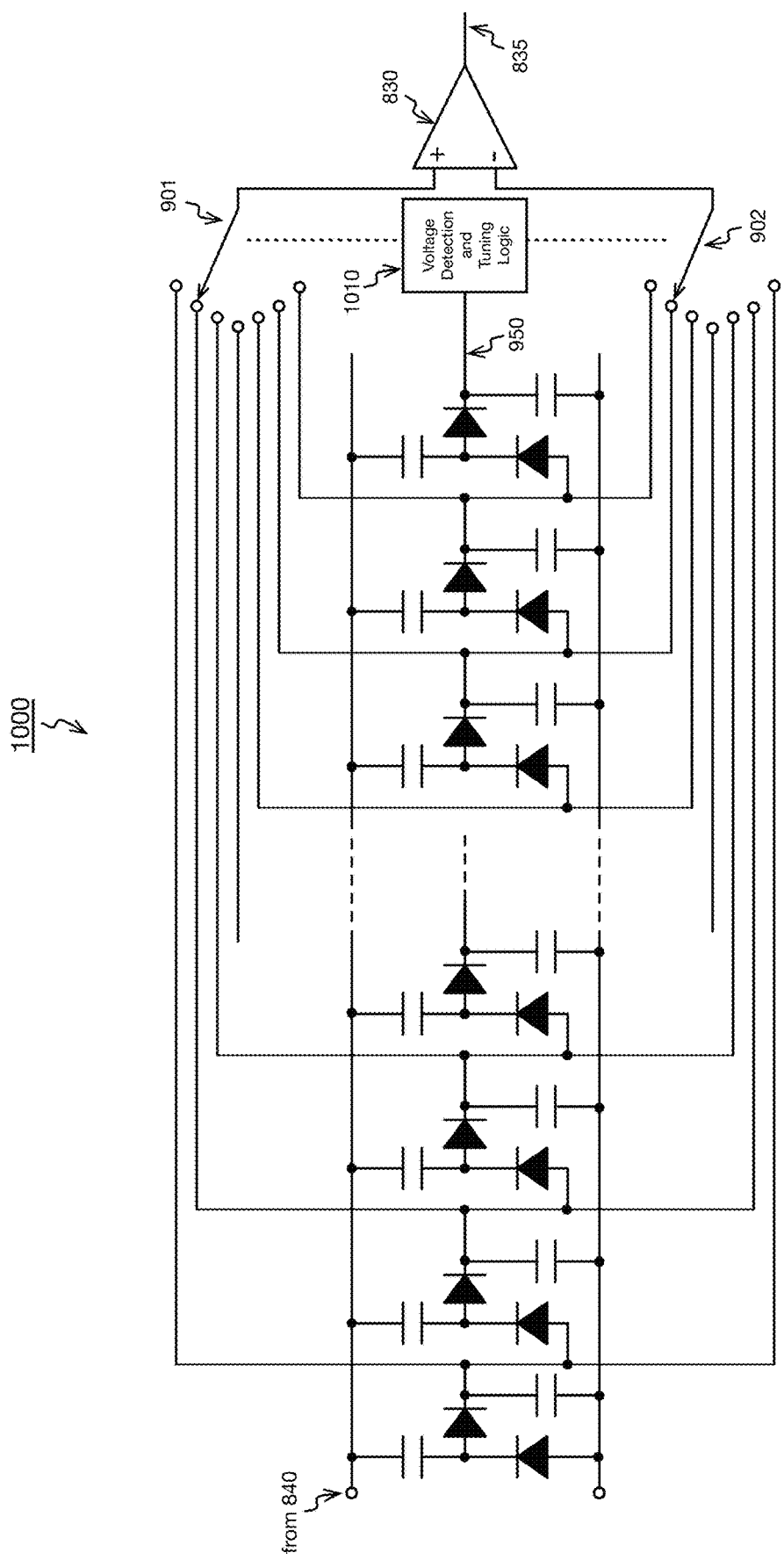
FIG. 11 is a schematic block diagram illustrating an example amplitude-modulated signal detection circuit including multiple configurable charge pump stages and also including voltage detection and tuning circuitry, in accordance with an embodiment.

FIG. 11 is a schematic block diagram illustrating a more detailed view of amplitude-modulated signal detection circuit 1000 including voltage detection and/or tuning circuitry 1010. As depicted in FIG. 11, voltage detection and/or tuning circuitry 1010 may detect a dc power supply voltage level at an output 950 of k-stage power charge pump 900, in an implementation. Also, in an implementation, voltage detection and/or tuning circuitry 1010 may detect envelope detector/comparator input signals 901 and/or 902. Based at least in part on the detected power supply voltage level and/or based at least in part on one or more characteristics of envelope detector/comparator input signals 901 and/or 902, voltage detection and/or tuning circuitry 1010 may adjust a number of charge pump stages for m-fraction charge pump 900a and/or for n-fraction charge pump 900b, for example. In an implementation, the number of charge pump stages may be selected to enhance the functions of envelope detector/comparator 830, for example.

Figure 12:
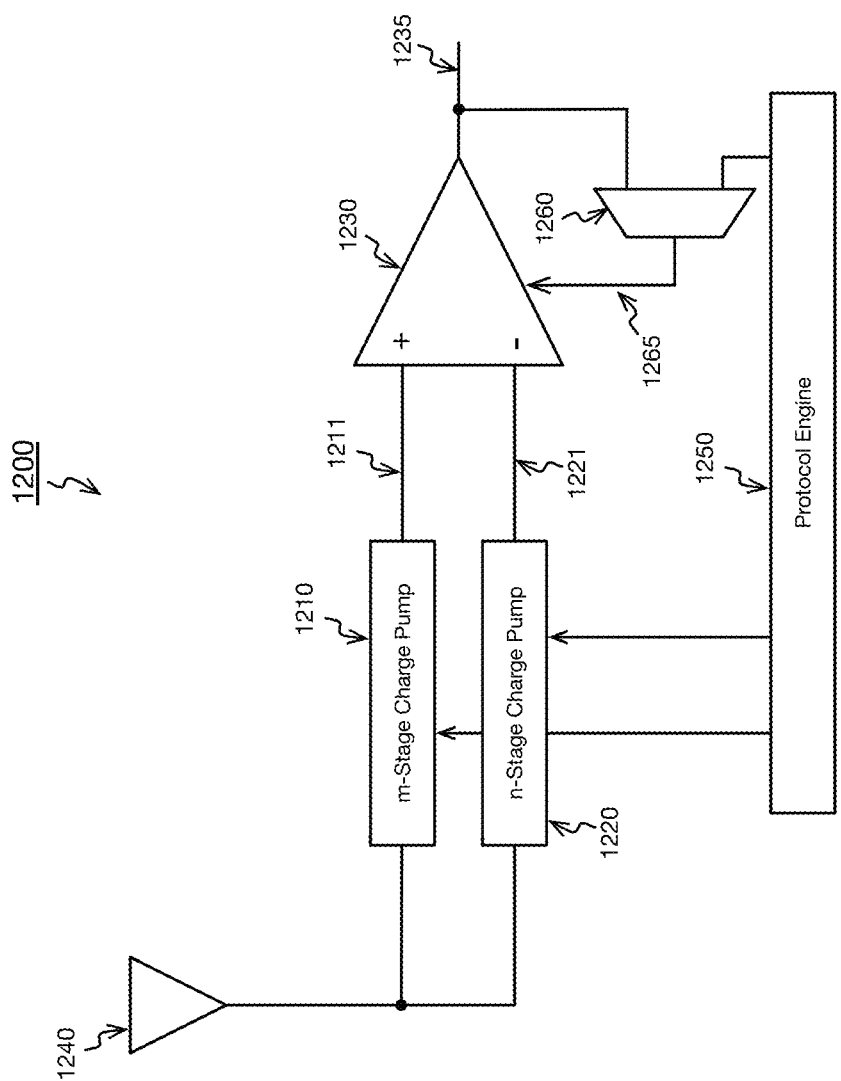
FIG. 12 is a schematic block diagram illustrating an example amplitude-modulated signal detection circuit including power and signal charge pumps and also including hysteresis configuration circuitry, in accordance with an embodiment.

FIG. 12 is a schematic block diagram illustrating an embodiment 1200 of another example amplitude-modulated signal detection circuit including hysteresis configuration circuitry 1260. In an implementation, amplitude-modulated signal detection circuit 1200 may comprise at least some characteristics similar to those discussed above in connection with amplitude-modulated signal detection circuits 500, 800 and/or 1000. For example, amplitude-modulated signal detection circuit 1200 may include an antenna 1240 may further include an m-stage charge pump 1210 and an n-stage charge pump 1220 to provide input signals 1211 and 1221, respectively, to an envelope detector/comparator 1230. Also, in an implementation, envelope detector/comparator 1230 may generate a demodulated signal 1235 based at least in part on input signals 1211 and/or 1221 provided by m-stage charge pump 1210 and an n-stage charge pump 1220, respectively.

Additionally, in an implementation, hysteresis configuration circuitry 1260 may monitor demodulated signal 1235 and may provide a hysteresis adjustment signal 1265 to envelope detector/comparator 1230 based at least in part on one or more characteristics of demodulated signal 1235.

Further, in an implementation, a protocol engine 1250 (e.g., GEN2 protocol) may generate one or more signals to inject into m-stage charge pump 1210 and an n-stage charge pump 1220, for example. Hysteresis configuration circuitry 1260 may monitor demodulated signal 1235 and may provide a hysteresis adjustment signal 1265 to envelope detector/comparator 1230 based at least in part on one or more characteristics of demodulated signal 1235 as envelop detector/comparator 1230 reacts to inputs signals 1211 and/or 1221 provided by into m-stage charge pump 1210 and an n-stage charge pump 1220 in response to the signal generated by protocol engine 1250, for example.

Additionally, in an implementation, one or more machine operations, such as one or more machine learning operations, may be performed to determine appropriate voltage-gain and/or bandwidth characteristics for m-stage charge pump 1210 and/or n-stage charge pump 1220 for a particular set of circumstances.

Figure 13:
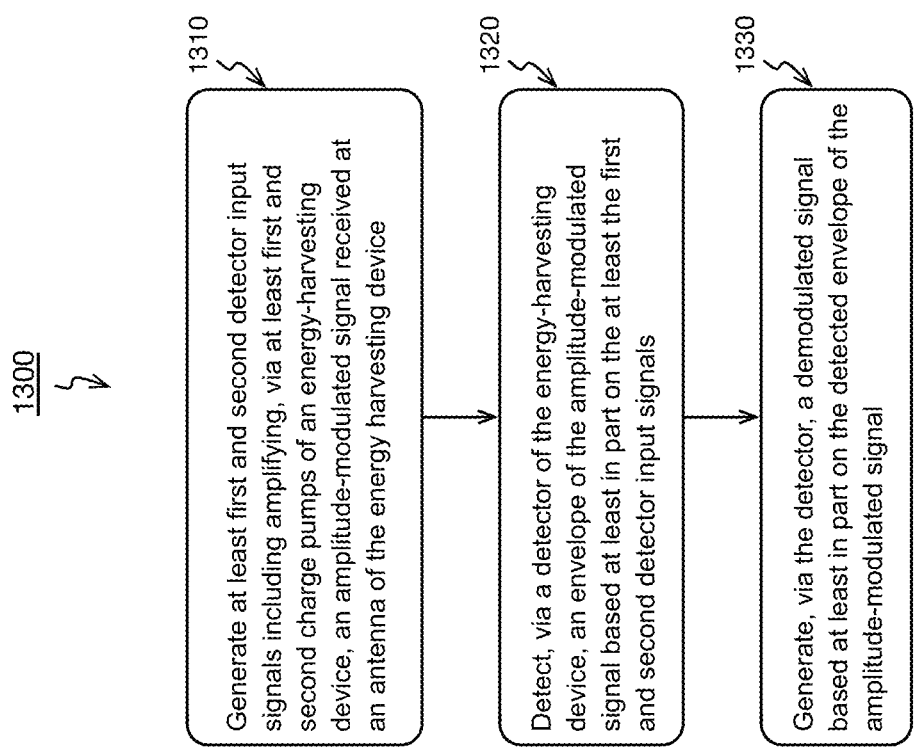
FIG. 13 is a flow diagram illustrating an example process for detecting, at an energy-harvesting device, an amplitude-modulated wireless signal, in accordance with an embodiment.

FIG. 13 is a flow diagram illustrating an embodiment 1300 of an example process for detecting, at an energy-harvesting device, a wireless amplitude-modulated signal. In a particular implementation, process 1300 may include operations that may be performed in conjunction with example amplitude-modulated signal detection circuits 500, 800, 1000 and/or 1200. It should be noted that content acquired or produced, such as, for example, input signals, output signals, operations, results, etc. associated with example process 1300 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In an implementation, example process 1300 may include generating at least first and second detector input signals including amplifying, via at least first and second charge pumps of an energy-harvesting device, an amplitude-modulated signal received at an antenna of the energy-harvesting device, as indicated at block 1310. For example, as discussed above, an RF signal may be received at an energy-harvesting device 130. An envelope detector/comparator circuit, such as envelope detector/comparator 530 of amplitude-modulated wireless signal detector circuit 500, for example, may comprise multiple inputs (e.g., two inputs). In an implementation, multiple charge pumps (e.g., charge pumps 510 and 520) may be utilized in the respective multiple input signal paths for envelope detector/comparator 530. Further, in an implementation, first and second charge pumps of an energy-harvesting device may amplify a received RF signal in accordance with particular voltage-gain, polarity and/or time constant (e.g., bandwidth) characteristics of the respective charge pumps.

Additionally, as indicated at block 1320, example process 1300 may include detecting, via a detector (e.g., envelope detector/comparator 530) of the energy-harvesting device (e.g., energy-harvesting device 130), an envelope of the received amplitude-modulated RF signal based at least in part on the first and second detector input signals, in an implementation. Further, for example, process 1300 may include generating, via the detector (e.g., envelope detector/comparator 530), a demodulated signal (e.g., demodulated signal 535) based at least in part on the detected envelope of the amplitude-modulated RF signal.

In an implementation, the at least the first and second charge pumps may comprise respective first and second bandwidth characteristics, wherein a bandwidth of the first charge pump is greater than a bandwidth of the second charge pump. Also, in an implementation, a first charge pump may comprise m instances of a plurality of instances of a particular charge pump circuit and a second charge pump may comprises n instances of the plurality of instances of the particular charge pump circuit. Additionally, for example, process 1300 may include generating a power voltage signal via the plurality of instances of the particular charge pump circuit. In an implementation, process 1300, for example, may include adjusting a hysteresis characteristic of a detector (e.g., envelope detector/comparator 530) based at least in part on the power voltage signal or at least in part on the demodulated signal, or a combination thereof.

Embodiments may further include an apparatus comprising an energy-harvesting device, wherein the energy-harvesting device includes at least first and second charge pumps to amplify an amplitude-modulated signal to generate at least first and second detector input signals. The energy-harvesting device may also include a detector to detect an envelope of the amplitude-modulated signal based at least in part on the at least the first and second detector input signals, wherein the detector further to generate a demodulated signal in accordance with the detected envelope of the amplitude-modulated signal. In an implementation, the at least the first and second charge pumps may amplify the amplitude-modulated signal to generate the at least the first and second detector input signals at least in part in accordance with respective first and second bandwidth characteristics. In an implementation, a first bandwidth for the first charge pump may be greater than a second bandwidth for the second charge pump.

In an implementation, the energy-harvesting device may further include one or more antennae. Also, the amplitude-modulated signal may comprise a radio-frequency signal received at the one or more antennae. In an implementation, the first charge pump may comprise an m-stage charge pump and the second charge pump may comprise an n-stage charge pump, wherein m>n. Further, in an implementation, the m-stage charge pump may comprise m instances of a particular charge pump circuit and the n-stage charge pump may comprise n instances of the particular charge pump circuit.

Additionally, in an implementation, an energy-harvesting device may further include circuitry to reconfigure a number of stages in the first charge pump or the second charge pump, or a combination thereof, and/or to reconfigure an output impedance of the first charge pump or an output impedance of the second charge pump, or a combination thereof, based at least in part on a voltage level detection at an output of the first charge pump or the second charge pump or a combination thereof. In an implementation, the energy-harvesting device may further comprise a protocol engine to control reconfiguration of the first charge pump or the second charge pump, or a combination there. In an implementation, the energy-harvesting device may further comprise circuitry to perform one or more machine operations to control reconfiguration of the first charge pump or the second charge pump, or a combination thereof. Also, in an implementation, an energy-harvesting device may include circuitry to adjust hysteresis of the detector based at least in part on a harvested supply voltage or at least in part on the demodulated signal, or a combination thereof.

Embodiments may further comprise an apparatus, such as an energy-harvesting device, wherein the energy-harvesting device includes one or more antennae to receive an amplitude-modulated radio frequency signal. An energy-harvesting device may also include a charge pump to comprise a plurality of instances of a particular charge pump stage to generate a power voltage signal, wherein m instances of the plurality of instances of the particular charge pump stage may amplify the radio frequency signal to generate a first detector input signal and wherein n instances of the plurality of instances of the of the particular charge pump stage may amplify the radio frequency signal to generate a second detector input signal. An energy-harvesting device may further include a detector to detect an envelope of the radio frequency signal based at least in part on the at least the first and second detector input signals, wherein the detector further to generate a demodulated signal in accordance with the detected envelope of the amplitude-modulated signal. In an implementation, m>n and the energy-harvesting device may further include circuitry to adjust m or n, or a combination thereof, based at least in part on the power voltage signal, the first detector input signal or the second detector input signal, or a combination thereof.

It should be noted that the various circuits disclosed herein may be described using computer aided design tools and expressed (or represented), as data and/or instructions embodied in various machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, RFID reader devices, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 14:
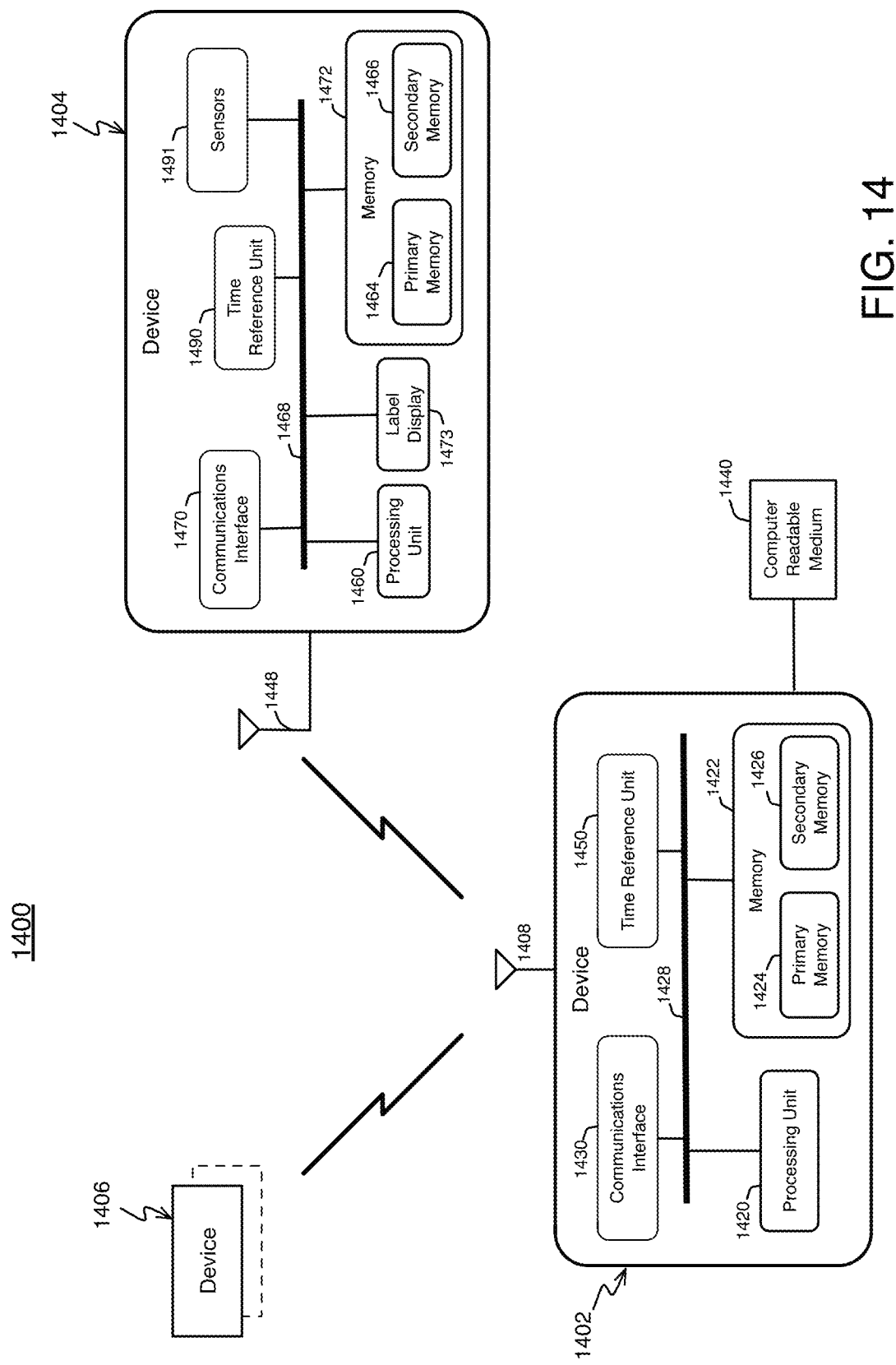
FIG. 14 is a schematic block diagram of an example computing system in accordance with an embodiment.

In example embodiments, as shown in FIG. 14, a system embodiment may comprise a local network (e.g., device 1402 and medium 1440) and/or another type of network, such as a computing and/or communications network. For purposes of illustration, therefore, FIG. 14 shows an embodiment 1400 of a system that may be employed to implement either type or both types of networks. A network may comprise one or more network connections, links, processes, services, applications, and/or resources to facilitate and/or support communications, such as an exchange of communication signals, for example, between a computing device, such as device 1402, and another computing device, such as 1404, which may, for example, comprise one or more client computing devices and/or one or more server computing device.

Example devices in FIG. 14 may comprise features, for example, of a computing devices to implement a reader device (e.g., reader device 110, FIG. 1) and/or an energy-harvesting device (e.g., energy-harvesting device 130, FIG. 1), in an embodiment. It is further noted that the term computing device, in general, whether employed as a client and/or as a server, or otherwise, refers at least to a processor and a memory connected by a communication bus. A "processor" or "processing unit," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-13 and in the text associated with the foregoing FIGS. 1-13 of the present patent application.

FIG. 14 is a schematic diagram illustrating an example system 1400 that may include one or more devices configurable to implement techniques or processes described above, for example, in connection with FIGS. 1-13. System 1400 may include, for example, a first device 1402, a second device 1404, and a third device 1406, which may be operatively coupled together through a wireless communications techniques described above.

First device 1402, second device 1404 and third device 1406, as shown in FIG. 14, may be representative of any device, appliance or machine that may be configurable to exchange signals and/or messages over a wireless communications network. By way of example but not limitation, any of first device 1402, second device 1404, or third device 1406 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1402, 1404, and 1406, respectively, may comprise one or more of a reader device or an energy-harvesting device in accordance with the examples described herein.

Similarly, a wireless communications network, as shown in FIG. 14, may be representative of one or more communication links, processes, or resources configurable to support the exchange of signals and/or messages between at least two of first device 1402, second device 1404, and third device 1406. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. In an embodiment, wireless communication links in a wireless communication link may enable one or more signal messaging formats set forth in one or more ISO/IEC 18000 conventions.

It is recognized that all or part of the various devices and networks shown in FIG. 14, and the processes and methods as further described herein, may be implemented using or otherwise including hardware, firmware, software, or any combination thereof.

Thus, by way of example but not limitation, first device 1402 may include at least one processing unit 1420 that is operatively coupled to a memory 1422 through a bus 1428. Likewise, second device 1404 may include at least one processing unit 1460 that is operatively coupled to a memory 1472 through a bus 1468.

Processing unit 1420 and/or processing unit 1460 may be representative of one or more circuits configurable to perform at least a portion of a computing procedure or process. By way of example but not limitation, processing unit 1420 and/or processing unit 1460 may include one or more processors, controllers, microprocessors, microcontrollers, application specific integrated circuits, digital signal processors, programmable logic devices, field programmable gate arrays, and the like, or any combination thereof.

Memory 1422 and/or memory 1472 may be representative of any mechanism for use in storing executable instructions, input/output values, parameters, measurements and/or symbols, etc. Memory 1422 may include, for example, a primary memory 1424 or a secondary memory 1426. Likewise, memory 1472 may include, for example, a primary memory 1464 or a secondary memory 1466. Primary memory 1424 and/or 1464 may include, for example, a random access memory, read only memory, non-volatile memory, etc. While illustrated in this example as being separate from processing unit 1420, it should be understood that all or part of primary memory 1424 may be provided within or otherwise co-located/coupled with processing unit 1420. Likewise, it should be understood that all or part of primary memory 1464 may be provided within or otherwise co-located/coupled with processing unit 1460. In a particular implementation, memory 1422 and processing unit 1420, and/or memory 1472 and processing unit 1460 may be configured to execute one or more aspects of process discussed above in connection with FIGS. 1-13.

Secondary memory 1426 and/or 1466 may include, for example, the same or similar type of memory as primary memory or one or more storage devices or systems, such as, for example, a disk drive, an optical disc drive, a tape drive, a solid state memory drive, etc. In certain implementations, secondary memory 1426 may be operatively receptive of, or otherwise configurable to couple to, a computer-readable medium 1440. Computer-readable medium 1440 may include, for example, any non-transitory medium that can carry or make accessible data, code or instructions for one or more of the devices in system 1400. Computer-readable medium 1440 may also be referred to as a storage medium.

First device 1402 may include a communication interface 1430 and second device 1404 may include a communication interface 1470 that provide for or otherwise supports an operative coupling of first device 1402 and second device 1404 at least through antennas 1408 and 1448. By way of example but not limitation, communication interface 1430 and/or 1470 may include a network interface device or card, a modem, a router, a switch, a transceiver, and the like. In other alternative implementations, communication interface 1430 and/or 1470 may comprise a wired/LAN interface, wireless LAN interface (e.g., IEEE std. 802.11 wireless interface) and/or a wide area network (WAN) air interface. In a particular implementation, communication interface 1430 and/or 1470 may include circuitry to enable an exchange of messages according to one or more signal messaging formats set forth in one or more ISO/IEC 18000 conventions. In a particular implementation, antenna 1408 in combination with communication interface 1430, and antenna 1440 in combination with communication interface 1470 may be used to implement transmission and reception of signals as illustrated in FIGS. 1-13.

According to an embodiment, second device 1404 may further comprise sensors 1491 which may comprise, for example, a light sensor and/or temperature sensor (e.g., embedded in a smart food label) capable of generating signals representative of measurements and/or observations of particular conditions. In addition, second device 1404 may comprise display label 1473 to display values computed at processing unit 1460. Display label 1473 may comprise, for example, via printed e-ink display. Such values displayed on and/or through display label 1473 may comprise values computed at processing unit 1460 based, at least in part, on signals representative of measurements and/or observations obtained from sensors 1491. Second device 1404 may also comprise circuitry and/or structures (not shown) for collecting and/or harvesting energy and/or power from a signal received at antenna 1448 (e.g., RF signal 115) such as, for example, charge pumps employing Dickson and/or cross-coupled doublers as described in "Power Supply Generation in CMOS Passive UHF RFID Tags," Alessio Facen and Andrea Boni, 2006 Ph.D. Research in Microelectronics and Electronics, IEEE Xplore, 11 Sep. 2006 and/or described in "Self-Biased Differential Rectifier With Enhanced Dynamic Range for Wireless Powering," Mahmoud H. Ouda, Waleed Khalil and Khaled N. Salama, IEEE Transactions on Circuits and Systems II: Express Briefs, Vol. 64, No. 5, May 2017, for example. As pointed out above, such energy collected and/or harvested from a signal received at antenna 1448 may be used for powering subsystems of second device 1404. Such subsystems of second device 1404 may include, for example, communication interface 1470, time reference unit 1490, sensors 1491, processing unit 1460, label display 1473 and/or memory 1472. It should be understood, however, that these are merely examples of subsystems of a device that may be powered based, at least in part, from energy harvested and/or collected from an RF signal received at an antenna, and claimed subject matter is not limited in this respect.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 14, first device 1402 and/or second device 1404 may provide one or more sources of executable computer instructions in the form physical states and/or signals (e.g., stored in memory states), for example. First device 1402 may communicate with second device 1404 by way of a network connection, such as by uplink and downlink signals (e.g., uplink signal 122 and downlink signal 124, FIG. 1A), for example. As previously mentioned, a connection, while physical, may not necessarily be tangible. Although first and second devices 1402 and 1404 of FIG. 14 show various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1422 and/or 1472 may comprise any non-transitory storage mechanism. Memory 1422/1472 may comprise, for example, primary memory 1424/1464 and secondary memory 1426/1466, additional memory circuits, mechanisms, or combinations thereof may be used. Memory 1422 and/or memory 1472 may comprise, for example, random access memory, non-volatile memory, read only memory, etc., such as in the form of one or more storage devices and/or systems, such as, for example, a disk drive including an optical disc drive, a tape drive, a solid-state memory drive, etc., just to name a few examples.

Memory 1422 and/or 1472 may be utilized to store a program of executable computer instructions. For example, processor 1420 and/or processor 1460 may fetch executable instructions from memory and proceed to execute the fetched instructions. Memory 1422 may also comprise a memory controller for accessing device readable-medium 640 that may carry and/or make accessible digital content, which may include code, and/or instructions, for example, executable by processor 1420 and/or some other device, such as a controller, as one example, capable of executing computer instructions, for example. Under direction of processor 1420, a non-transitory memory, such as memory cells storing physical states (e.g., memory states), comprising, for example, a program of executable computer instructions, may be executed by processor 1420 and able to generate signals to be communicated via a network, for example, as previously described. Generated signals may also be stored in memory, also previously suggested.

Memory 1422 may store electronic files and/or electronic documents, such as relating to one or more users, and may also comprise a computer-readable medium that may carry and/or make accessible content, including code and/or instructions, for example, executable by processor 1420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 14, processor 1420 and/or 1460 may comprise one or more circuits, such as digital circuits, to perform at least a portion of a computing procedure and/or process. By way of example, but not limitation, processor 1420 and/or 1460 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1420 and/or 1460 may perform signal processing, typically substantially in accordance with fetched executable computer instructions, such as to manipulate signals and/or states, to construct signals and/or states, etc., with signals and/or states generated in such a manner to be communicated and/or stored in memory, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. An apparatus, comprising:
    at least first and second charge pumps of an energy-harvesting device to amplify an amplitude-modulated signal to generate at least first and second detector input signals, wherein the first and second charge pumps to comprise respective first and second frequency response characteristics; and
    a detector of the energy-harvesting device to detect an envelope of the amplitude-modulated signal based at least in part on the at least the first and second detector input signals, wherein the detector further to generate a demodulated signal in accordance with the detected envelope of the amplitude-modulated signal.

2. The apparatus of claim 1, wherein the at least the first and second charge pumps to amplify the amplitude-modulated signal to generate the at least the first and second detector input signals at least in part in accordance with the respective first and second frequency response characteristics.

3. The apparatus of claim 1, wherein a first time constant for the first charge pump is different than a second time constant for the second charge pump.

4. The apparatus of claim 1, wherein the energy-harvesting device to further include one or more antennae and wherein the amplitude-modulated signal to comprise a radio-frequency signal received at the one or more antennae.

5. The apparatus of claim 1, wherein the first charge pump to comprise an m-stage charge pump and wherein the second charge pump to comprise an n-stage charge pump, wherein m>n.

6. The apparatus of claim 5, wherein the m-stage charge pump to comprise m instances of a particular charge pump circuit.

7. The apparatus of claim 6, wherein the n-stage charge pump to comprise n instances of the particular charge pump circuit.

8. The apparatus of claim 1, wherein the energy-harvesting device to further include circuitry to reconfigure a number of stages in the first charge pump or the second charge pump, or a combination thereof, and/or to reconfigure an output impedance of the first charge pump or an output impedance of the second charge pump, or a combination thereof, based at least in part on a voltage level detection at an output of the first charge pump or the second charge pump or a combination thereof.

9. The apparatus of claim 8, wherein the energy-harvesting device to further comprise a protocol engine to control reconfiguration of the first charge pump or the second charge pump, or a combination thereof.

10. The apparatus of claim 8, wherein the energy-harvesting device to further comprise circuitry to perform one or more machine operations to control reconfiguration of the first charge pump or the second charge pump, or a combination thereof.

11. The apparatus of claim 1, further comprising circuitry to adjust hysteresis of the detector based at least in part on a harvested supply voltage or at least in part on the demodulated signal, or a combination thereof.

12. A method, comprising:
generating at least first and second detector input signals including amplifying, via at least first and second charge pumps of an energy-harvesting device, an amplitude-modulated signal received at an antenna of the energy-harvesting device, wherein the first and second charge pumps comprise respective first and second frequency response characteristics;
detecting, via a detector of the energy-harvesting device, an envelope of the amplitude-modulated signal based at least in part on the at least the first and second detector input signals; and
generating, via the detector, a demodulated signal based at least in part on the detected envelope of the amplitude-modulated signal.

13. The method of claim 12, wherein a time constant of the first charge pump is different than a time constant of the second charge pump.

14. The method of claim 12, wherein the amplitude-modulated signal to comprise a radio-frequency signal.

15. The method of claim 14, wherein the first charge pump comprises m instances of a plurality of instances of a particular charge pump circuit and wherein the second charge pump comprises n instances of the plurality of instances of the particular charge pump circuit.

16. The method of claim 15, further comprising generating a power voltage signal via the plurality of instances of the particular charge pump circuit.

17. The method of claim 16, further comprising adjusting a hysteresis characteristic of the detector based at least in part on the power voltage signal or at least in part on the demodulated signal, or a combination thereof.

18. The method of claim 12, further comprising:
detecting a voltage level at an output of the first charge pump or the second charge pump, or a combination thereof; and
reconfiguring a number of stages in the first charge pump, reconfiguring a number of stages of the second charge pump, reconfiguring an output impedance of the first charge pump or reconfiguring an output impedance of the second charge pump, or a combination thereof, based at least in part on the detected voltage level at the output of the first charge pump or the second charge pump, or the combination thereof.

19. An apparatus, comprising:
one or more antennae to receive an amplitude-modulated radio frequency signal at an energy-harvesting device;
a charge pump of the energy-harvesting device to comprise a plurality of instances of a particular charge pump stage to generate a power voltage signal, wherein m instances of the plurality of instances of the particular charge pump stage to amplify the amplitude-modulated radio frequency signal to generate a first detector input signal and wherein n instances of the plurality of instances of the of the particular charge pump stage to amplify the amplitude-modulated radio frequency signal to generate a second detector input signal; and
a detector of the energy-harvesting device to detect an envelope of the amplitude-modulated radio frequency signal based at least in part on the at least the first and second detector input signals, wherein the detector further to generate a demodulated signal in accordance with the detected envelope of the amplitude-modulated radio frequency signal.

20. The apparatus of claim 19, wherein m>n and wherein the energy-harvesting device to further include circuitry to adjust m or n, or a combination thereof, based at least in part on the power voltage signal, the first detector input signal or the second detector input signal, or a combination thereof.

* * * * *